United States Patent
Konoto et al.

(10) Patent No.: US 9,966,756 B2
(45) Date of Patent: May 8, 2018

(54) THERMAL POWER GENERATION APPARATUS AND THERMAL POWER GENERATION SYSTEM

(71) Applicant: Panasonic Intellectual Property Management Co., Ltd., Osaka (JP)

(72) Inventors: Masaaki Konoto, Kyoto (JP); Yoshio Tomigashi, Osaka (JP); Noriyoshi Nishiyama, Osaka (JP); Takumi Hikichi, Osaka (JP); Atsuo Okaichi, Osaka (JP); Osao Kido, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 428 days.

(21) Appl. No.: 14/723,509

(22) Filed: May 28, 2015

(65) Prior Publication Data
US 2015/0364910 A1    Dec. 17, 2015

(30) Foreign Application Priority Data

Jun. 17, 2014 (JP) ................................. 2014-124328

(51) Int. Cl.
*F01D 15/10* (2006.01)
*F01K 11/00* (2006.01)
(Continued)

(52) U.S. Cl.
CPC ............. *H02H 7/067* (2013.01); *F01D 15/10* (2013.01); *F01K 11/00* (2013.01); *F01K 13/02* (2013.01);
(Continued)

(58) Field of Classification Search
CPC .......... F01D 15/10; F01K 11/00–11/04; F01K 13/02; F01K 15/00; H02H 7/067;
(Continued)

(56) References Cited

U.S. PATENT DOCUMENTS 5,847,520 A * 12/1998 Theurillat ............... B60K 6/46
318/139
6,482,670 B1 * 11/2002 Yoshida ............ H01L 21/67109
136/205
(Continued)

FOREIGN PATENT DOCUMENTS

CN        101136582        3/2008
GB         2489753        10/2012
(Continued)

OTHER PUBLICATIONS

Grid-interconnection Code, JEAC9701-2012, JESC E0019(2012), 2013, Part1.

(Continued)

*Primary Examiner* — Levi Gannon
(74) *Attorney, Agent, or Firm* — McDermott Will & Emery LLP

(57) ABSTRACT

A thermal power generation apparatus includes a control circuit that selects a single operation mode from among a plurality of modes including a normal mode and a specific mode on the basis of a voltage in a commercial system. The normal mode is an operation mode in which alternating-current power output from an inverter is adjusted so that a direct-current voltage in a direct-current power line follows a target voltage. The specific mode is an operation mode in which direct-current power absorbed by an electric power absorber and/or the amount of heat per unit time supplied to a heat engine are/is adjusted so that the direct-current voltage follows the target voltage.

20 Claims, 19 Drawing Sheets

(51) Int. Cl.
| | |
|---|---|
| *F01K 13/02* | (2006.01) |
| *F01K 15/00* | (2006.01) |
| *H02H 7/06* | (2006.01) |
| *H02J 3/32* | (2006.01) |
| *H02M 5/40* | (2006.01) |
| *H02P 9/04* | (2006.01) |
| *H02P 9/10* | (2006.01) |
| *H02P 9/00* | (2006.01) |
| *H02J 7/14* | (2006.01) |

(52) U.S. Cl.
CPC .............. *F01K 15/00* (2013.01); *H02J 3/32* (2013.01); *H02J 7/1415* (2013.01); *H02M 5/40* (2013.01); *H02P 9/006* (2013.01); *H02P 9/04* (2013.01); *H02P 9/102* (2013.01)

(58) Field of Classification Search
CPC . H02J 3/32; H02J 7/1415; H02M 5/40; H02P 9/006; H02P 9/04; H02P 9/102
USPC .......................................... 136/205; 307/103
See application file for complete search history.

(56) References Cited

U.S. PATENT DOCUMENTS

| | | | |
|---|---|---|---|
| 7,081,684 B2 * | 7/2006 | Patel | H01L 35/00 136/205 |
| 8,061,139 B2 * | 11/2011 | Bronicki | F01K 23/065 60/616 |
| 2004/0119291 A1 | 6/2004 | Hamrin et al. | |
| 2007/0017223 A1 * | 1/2007 | Wootton | F02B 63/04 60/645 |
| 2008/0238108 A1 * | 10/2008 | Edelson | B60L 11/04 290/40 C |
| 2010/0182809 A1 * | 7/2010 | Cullinane | H02P 9/02 363/34 |
| 2011/0035070 A1 * | 2/2011 | Kanai | H02J 3/14 700/288 |
| 2014/0175886 A1 * | 6/2014 | Kwok | H02J 7/34 307/46 |

FOREIGN PATENT DOCUMENTS

| | | |
|---|---|---|
| JP | 2005-312289 | 11/2005 |
| WO | 1999/052193 | 10/1999 |

OTHER PUBLICATIONS

The Extended European Search Report dated Oct. 27, 2015 for the related European Patent Application No. 15170066.3.

* cited by examiner

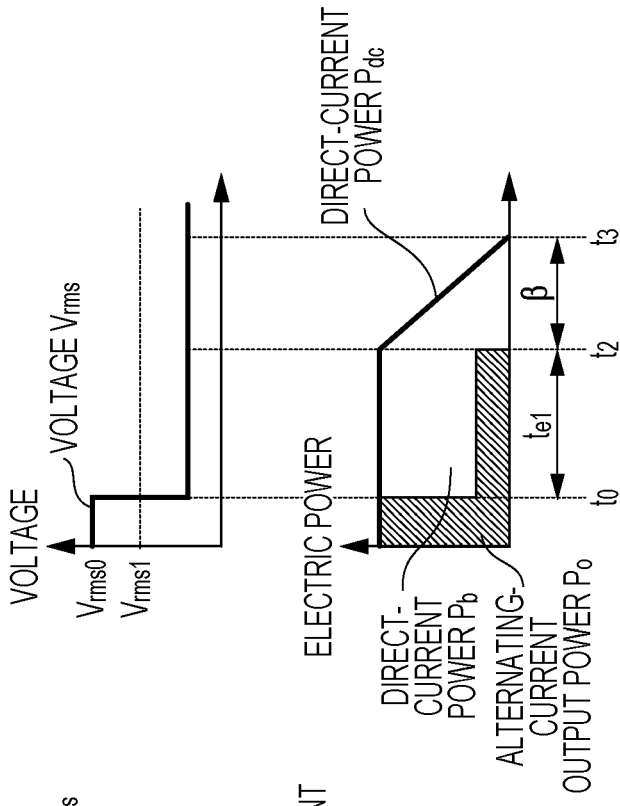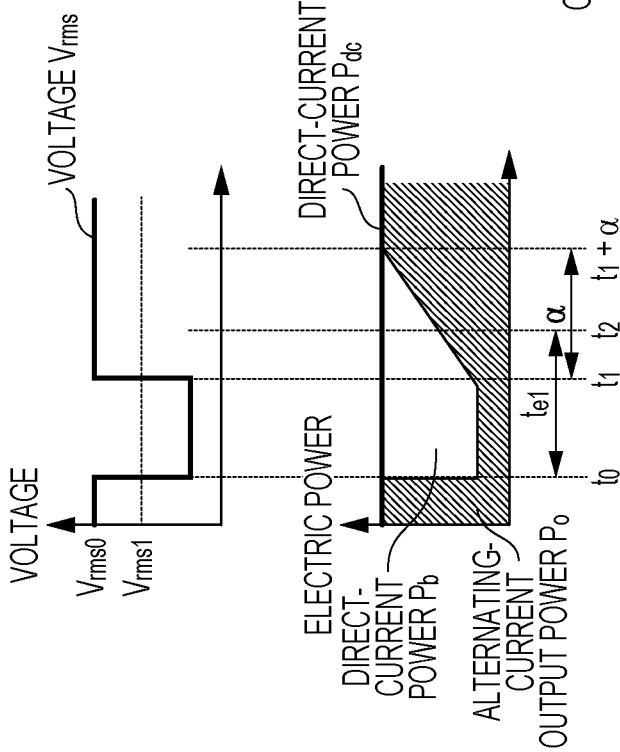

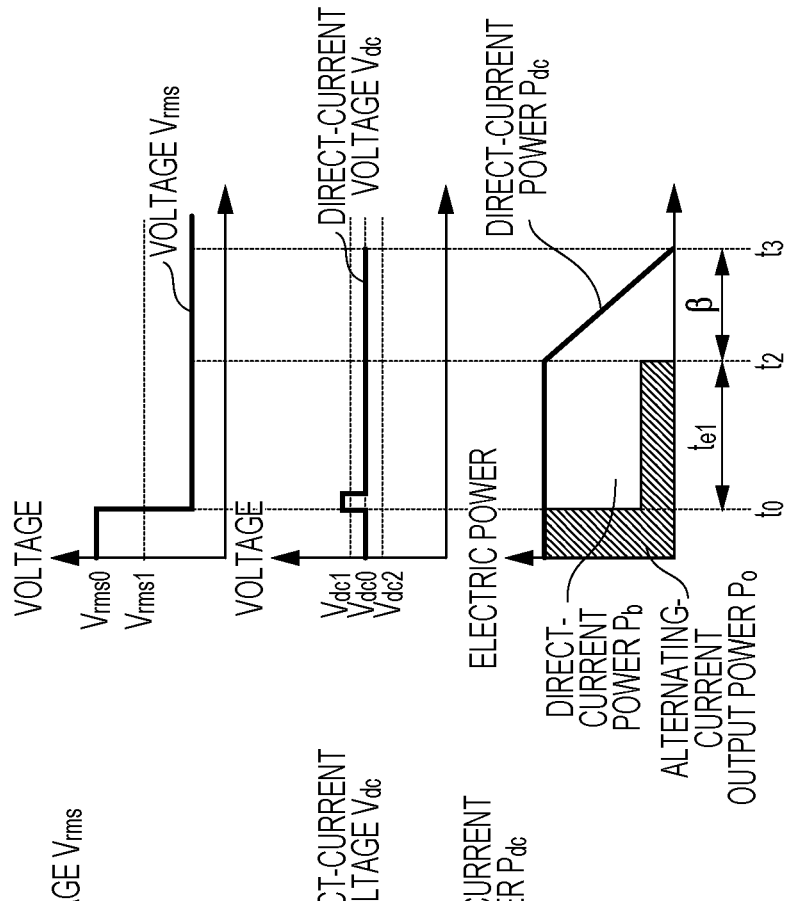
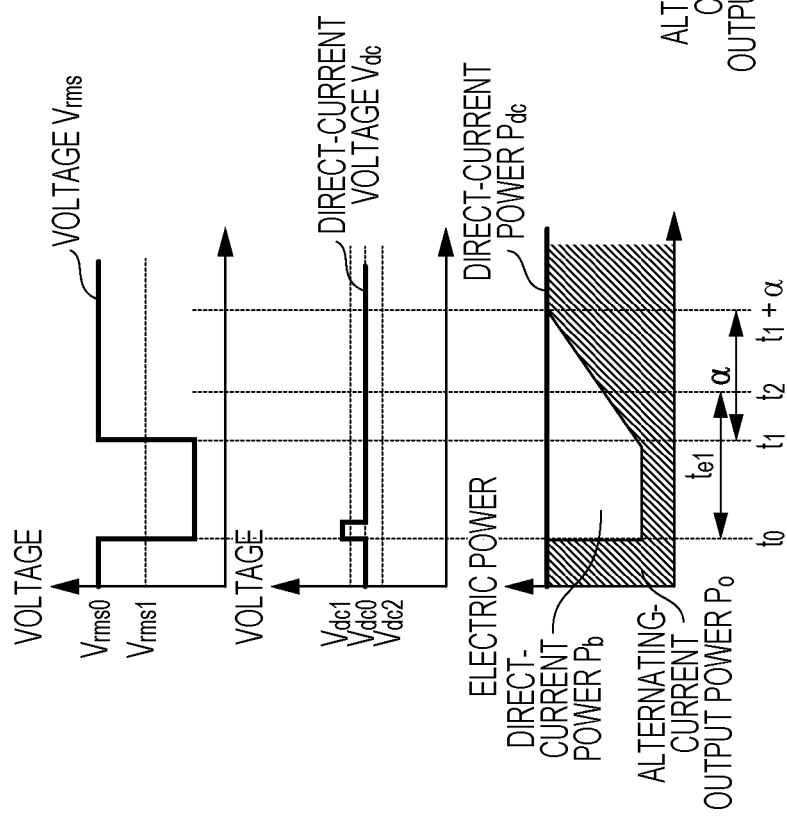

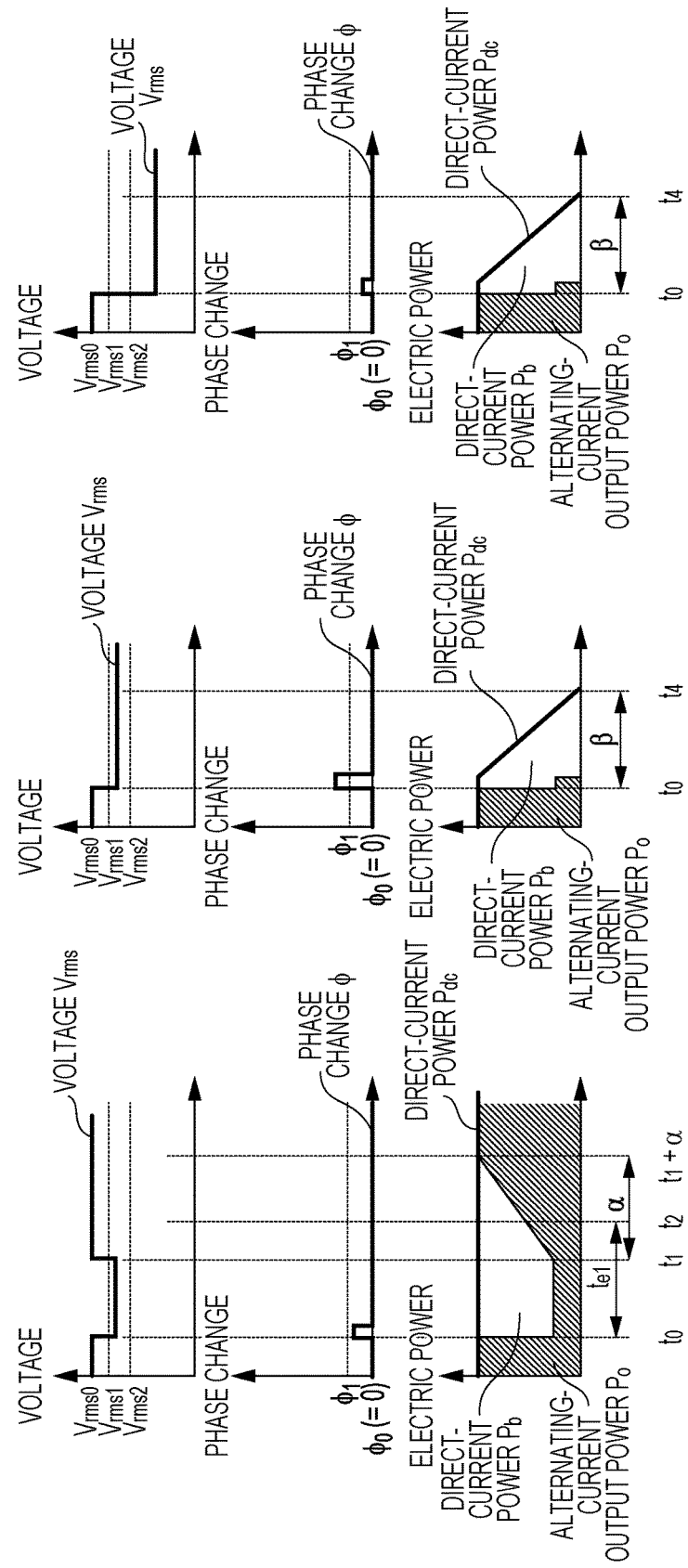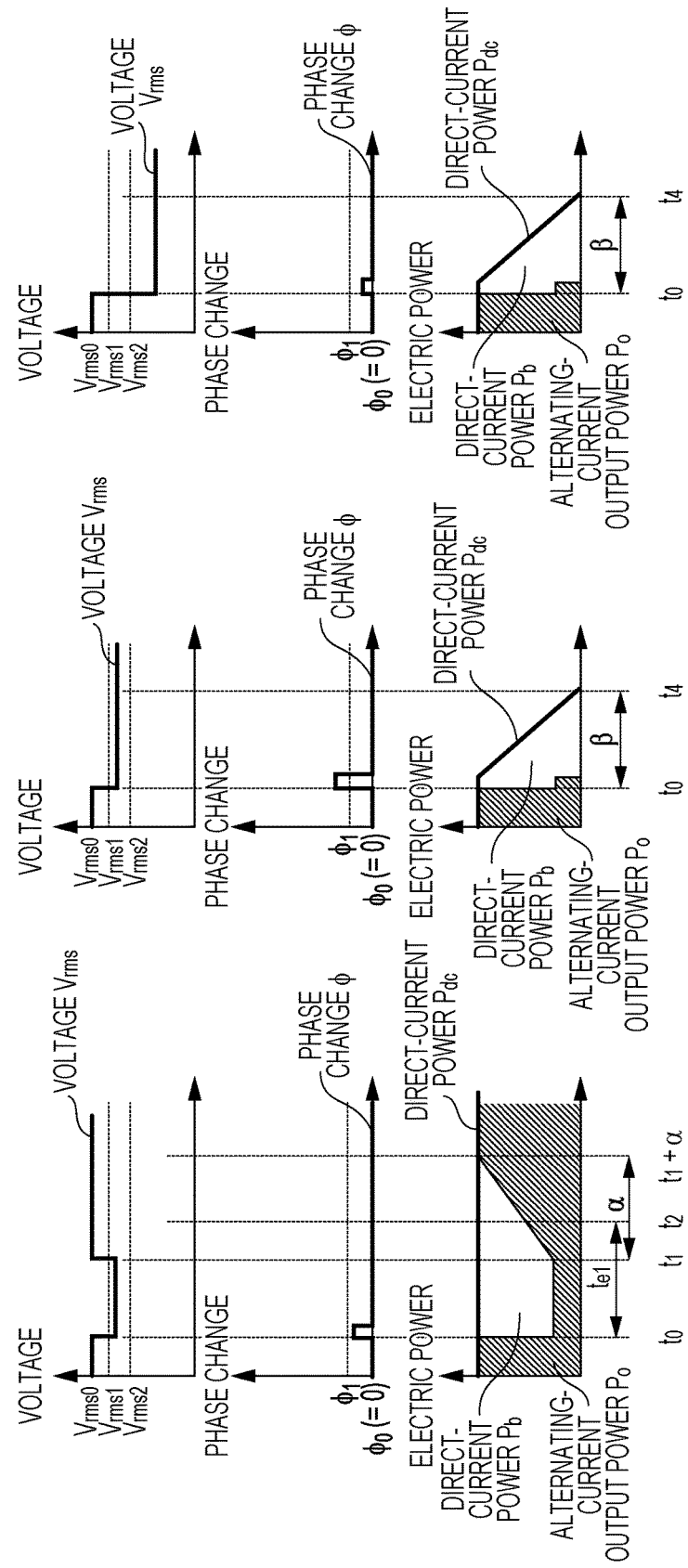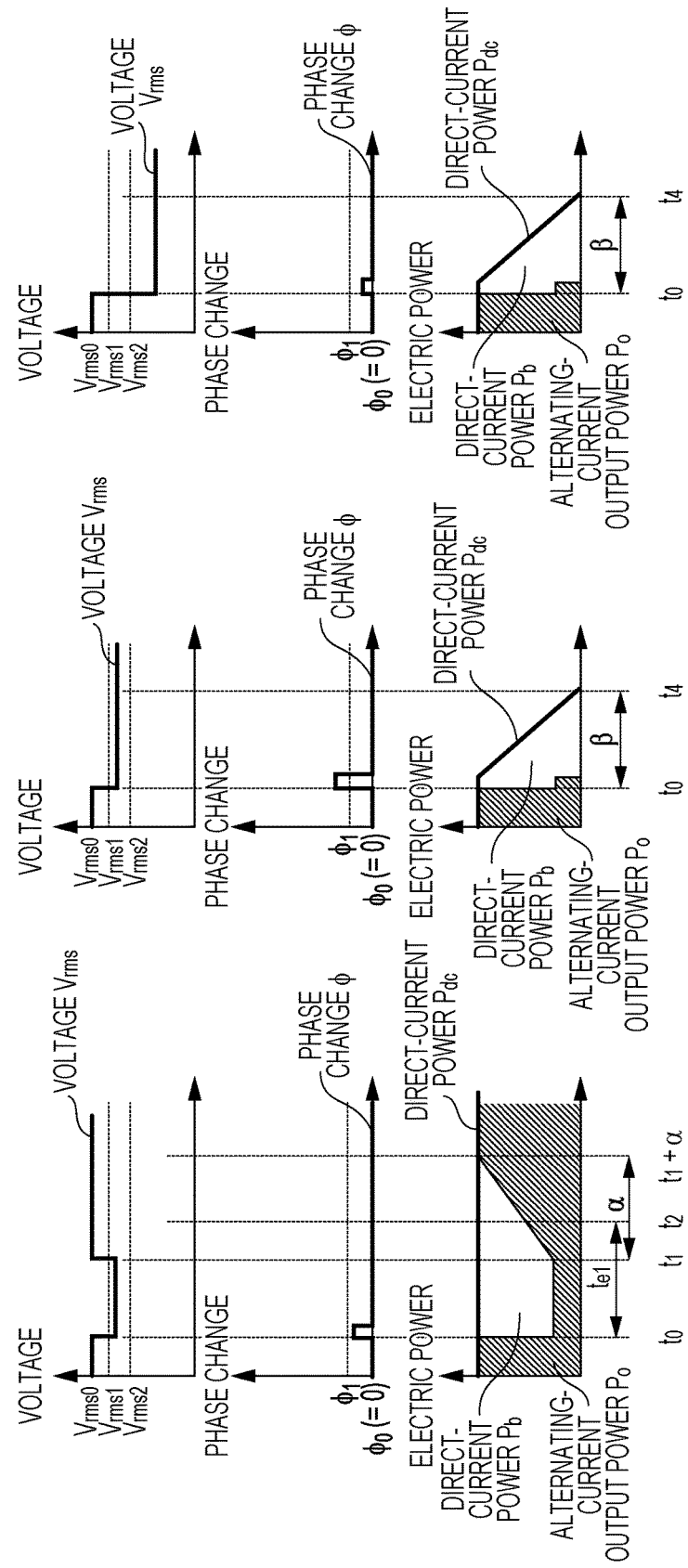

THERMAL POWER GENERATION APPARATUS AND THERMAL POWER GENERATION SYSTEM

BACKGROUND

1. Technical Field

The present disclosure relates to a thermal power generation apparatus and a thermal power generation system.

2. Description of the Related Art

Conventionally, a dispersed power source apparatus is interconnected to a commercial system. Japanese Patent No. 4889956 and Grid-interconnection Code (JEAC9701-2012) 2013 revised version 1 describe a technique concerning a dispersed power source apparatus and a commercial system. Japanese Patent No. 4889956 describes use of a thermal power generation apparatus as a dispersed power source apparatus.

In the thermal power generation apparatus of Japanese Patent No. 4889956, a working medium evaporates in a steam generator. An expander generates mechanical power from the working fluid. A power generator generates alternating-current power from the mechanical power. A rectifier converts the alternating-current power into direct-current power. An inverter generates alternating-current power at a predetermined frequency from the direct-current power. The rectifier and the inverter are connected to each other by a direct-current power line. A direct-current voltage in the direct-current power line is kept at a predetermined voltage. According to Japanese Patent No. 4889956, the direct-current voltage in the direct-current power line is kept at the predetermined voltage by adjusting an output alternating current supplied from the inverter to the commercial system.

SUMMARY

The thermal power generation apparatus of Japanese Patent No. 4889956 cannot cope properly with the problem that can arise in a case where an abnormality occurs in a commercial system.

In one general aspect, the techniques disclosed here feature a thermal power generation apparatus including: a heat engine that extracts mechanical power from heat supplied by a heat supply source; a power generator that generates alternating-current power from the mechanical power; a converter that generates direct-current power from the alternating-current power; an inverter that is connected to the converter via a direct-current power line, the inverter generating alternating-current power from the direct-current power and outputting the alternating-current power to a commercial system; an electric power absorber that is connected to the direct-current power line connecting the converter and the inverter, the electric power absorber absorbing at least part of the direct-current power transmitted from the converter toward the inverter; and a control circuit that detects a voltage drop and voltage recovery in the commercial system and selects a single operation mode from among a plurality of modes including a normal mode and a specific mode, in a case where the normal mode is selected, the control circuit controlling the inverter to adjust the alternating-current power output from the inverter so that a direct-current voltage in the direct-current power line follows a target voltage, in a case where the specific mode is selected, the control circuit controlling the inverter to adjust the alternating-current power output from the inverter so that the direct-current voltage in the direct-current power line follows the target voltage and controlling the electric power absorber to absorb at least part of the direct-current power, and the amount of alternating-current power output from the inverter in the specific mode being larger than zero and smaller than that in the normal mode.

The thermal power generation apparatus of the present disclosure can properly cope with the problem that can arise in a case where an abnormality occurs in a commercial system.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 6A and 6B are time charts for explaining control performed by the thermal power generation apparatus of FIG. 1;

FIGS. 12A and 12B are time charts for explaining control performed by the thermal power generation apparatus of FIG. 10;

FIGS. 16A through 16C are time charts for explaining control performed by a modification of the thermal power generation apparatus of FIG. 1;

DETAILED DESCRIPTION

Figure 1:
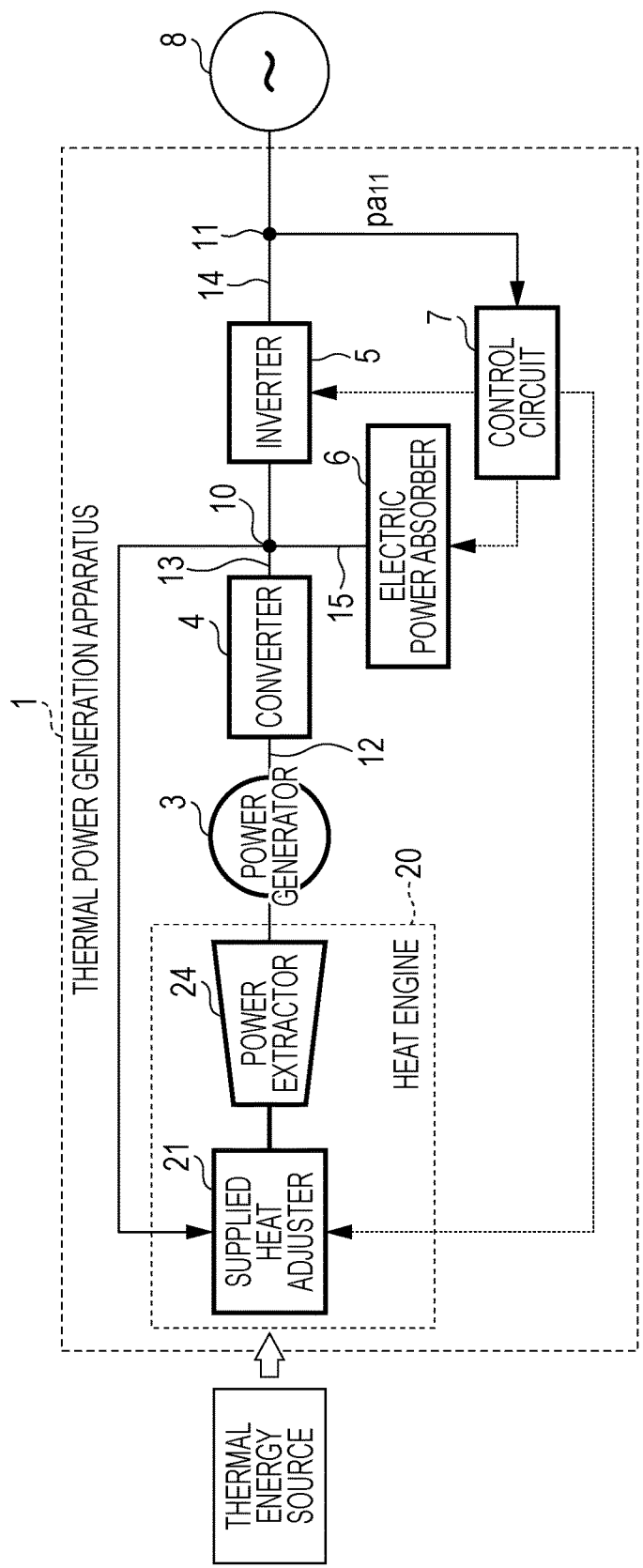
FIG. 1 is a view illustrating a configuration example of a thermal power generation apparatus.

Underlying Knowledge Forming Basis of the Present Disclosure

A dispersed power source apparatus interconnected to a commercial system can generate electric power and supply the electric power to the commercial system. During normal operation, the commercial system supplies or consumes a large amount of electric power. The commercial system sometimes experiences a momentary voltage drop and a system abnormality such as a power outage. If the dispersed power source continues supplying power to the commercial system during a system abnormality, a voltage continues to be applied to the commercial system. This poses a safety problem. As a precaution against such a case, the dispersed power source apparatus interconnected to the commercial system sometimes has a system interconnection protection function for stopping power generation and breaking the connection to the commercial system. The system interconnection protection function makes it possible to avoid the aforementioned safety problem.

System abnormalities can be largely classified into distribution line abnormalities and transmission line abnormalities. Distribution line abnormalities are abnormalities of an interconnection point between the dispersed power source apparatus and the commercial system. In order to cope with these abnormalities, the dispersed power source apparatus needs to be stopped in accordance with the system interconnection protection code. Meanwhile, transmission line abnormalities are abnormalities of a higher-order system. If the system interconnection protection function works in response to this abnormality and stops multiple dispersed power source apparatuses, the quality of electric power deteriorates. As dispersed power source apparatuses become more widespread, this problem is becoming more evident. From the perspective of maintenance of the quality of electric power, a dispersed power source apparatus interconnected to a commercial system needs to have a function (recovery function) for continuing operation even during a transmission line abnormality and for resuming power supply to the commercial system promptly after solving the transmission line (commercial system) abnormality. With the recovery function, it is possible to suppress deterioration of the quality of electric power. Grid-interconnection Code (JEAC9701-2012) 2013 revised version 1 describes FRT (Fault Ride Through) requirements concerning the recovery function. According to Grid-interconnection Code (JEAC9701-2012) 2013 revised version 1, in order to satisfy the FRT requirements, it is necessary for a dispersed power source apparatus to continue operation for a predetermined time, even if a voltage drop occurs in a commercial system, and to recover output power of the dispersed power source apparatus to 80% or more of output power before the voltage drop within 1 second after voltage recovery in the commercial system.

Conventionally, a solar power generation apparatus has been used as a dispersed power source apparatus interconnected to a commercial system. A solar power generation apparatus can actively control generated power. Specifically, the solar power generation apparatus can rapidly control generated power. In contrast, a conventional thermal power generation apparatus cannot rapidly decrease generated power, even if supply of thermal energy from a heat source is blocked. Moreover, the conventional thermal power generation apparatus cannot rapidly increase generated power even if supply of thermal energy is resumed. Therefore, the conventional thermal power generation apparatus cannot satisfy the FRT requirements.

As a result of diligent studies to realize a thermal power generation apparatus used as a dispersed power source apparatus interconnected to a commercial system, the inventors of the present invention achieved the following aspects of the present disclosure.

A thermal power generation apparatus according to a first aspect of the present disclosure includes a heat engine that extracts mechanical power from heat supplied by a heat supply source; a power generator that generates alternating-current power from the mechanical power; a converter that generates direct-current power from the alternating-current power; an inverter that is connected to the converter via a direct-current power line, the inverter generating alternating-current power from the direct-current power and outputting the alternating-current power to a commercial system; an electric power absorber that is connected to the direct-current power line connecting the converter and the inverter, the electric power absorber absorbing at least part of the direct-current power transmitted from the converter toward the inverter; and a control circuit that detects a voltage drop and voltage recovery in the commercial system and selects a single operation mode from among a plurality of modes including a normal mode and a specific mode, in a case where the normal mode is selected, the control circuit controlling the inverter to adjust the alternating-current power output from the inverter so that a direct-current voltage in the direct-current power line follows a target voltage, in a case where the specific mode is selected, the control circuit controlling the inverter to adjust the alternating-current power output from the inverter so that the direct-current voltage in the direct-current power line follows the target voltage and controlling the electric power absorber to absorb at least part of the direct-current power, and the amount of alternating-current power output from the inverter in the specific mode being larger than zero and smaller than that in the normal mode. In other words, the control circuit includes a processor and a memory storing a program, the program, when being executed by the processor, causing the control circuit to perform operations including: when selecting the normal mode, controlling the inverter to adjust the alternating-current power output from the inverter, thereby causing a direct-current voltage in the direct-current power line to follow a target voltage, and when selecting the specific mode, controlling the inverter to adjust the alternating-current power output from the inverter, thereby causing the direct-current voltage in the direct-current power line to follow the target voltage and controlling the electric power absorber to absorb at least part of the direct-current power, the amount of the alternating-current power output from the inverter in the specific mode being larger than zero and smaller than that in the normal mode.

The thermal power generation apparatus according to the first aspect includes an electric power absorber that absorbs at least part of the direct-current power transmitted from the converter toward the inverter and has a specific mode. In the specific mode, the direct-current voltage is caused to follow the target voltage, and the direct-current power absorbed by the electric power absorber is adjusted. In the specific mode, the amount of alternating-current power output from the inverter can be made larger than zero and smaller than that in the normal mode. According to the thermal power generation apparatus according to the first aspect, it is thus possible to output alternating-current output power suitable for the state of a commercial system while adjusting the direct-current voltage in the direct-current power line and to rapidly increase or decrease the alternating-current power output from the inverter.

In a second aspect, for example, the thermal power generation apparatus according to the first aspect may be arranged such that the control circuit detects a voltage drop and voltage recovery in the commercial system by using an electric parameter detected in the direct-current power line or an electric parameter detected in an alternating-current power line that transmits the alternating-current power output from the inverter; and the control circuit switches the operation mode from the normal mode to the specific mode upon detection of the voltage drop or switches the operation mode from the specific mode to the normal mode upon detection of the voltage recovery.

The thermal power generation apparatus according to the second aspect detects a voltage drop and voltage recovery in the commercial system by using an electric parameter detected in the direct-current power line and an electric parameter detected in the alternating-current power line that transmits the alternating-current power output from the inverter. It is therefore possible to speedily determine whether to decrease output power and whether to recover output power. As a result, it is possible to switch the operation mode at an appropriate timing.

In a third aspect, for example, the thermal power generation apparatus according to the second aspect may be arranged such that the electric parameter of the thermal power generation apparatus according to the second aspect the electric parameter is a voltage, a direct-current voltage, an electric current, an electric field, or a magnetic field.

In a fourth aspect, for example, the thermal power generation apparatus according to any one of the first through third aspects may be arranged such that the control circuit controls the inverter to set the alternating-current power output from the inverter to zero in a case where the voltage recovery is not detected within a limited time after switching from the normal mode to the specific mode.

In a fifth aspect, for example, the thermal power generation apparatus according to any one of the first through fourth aspects may be arranged to further include a connecting mechanism that connects the inverter and the commercial system, the control circuit controlling the connecting mechanism to breaks the connection between the inverter and the commercial system in a case where no voltage recovery is detected within a limited time after switching from the normal mode to the specific mode.

The thermal power generation apparatus according to the fourth aspect or the fifth aspect can be safely stopped in case of a power outage.

In a sixth aspect, for example, the thermal power generation apparatus according to any one of the first through fifth aspects may be arranged such that the amount of direct-current power absorbed by the electric power absorber in the specific mode is larger than that in the normal mode.

The thermal power generation apparatus according to the sixth aspect generates, in the specific mode, alternating-current output power that is lower than that in the normal mode but is not zero. This makes switching from the specific mode to the normal mode easy.

In a seventh aspect, for example, the thermal power generation apparatus according to any one of the first through sixth aspects may be arranged such that the electric power absorber includes a resistor and a semiconductor switch connected to the resistor.

According to the thermal power generation apparatus according to the seventh aspect, it is possible to accurately adjust the direct-current power absorbed by the electric power absorber. This allows the direct-current voltage in the direct-current power line to accurately follow the target voltage.

In an eighth aspect, for example, the thermal power generation apparatus according to any one of the first through sixth aspects may be arranged such that the electric power absorber includes a capacitor and a charge-discharge circuit connected to the capacitor, the charge-discharge circuit adjusting an electric current that flows into the capacitor and an electric current that flows out of the capacitor.

The thermal power generation apparatus according to the eighth aspect allows the direct-current voltage in the direct-current power line to accurately follow the target voltage as in the thermal power generation apparatus according to the sixth aspect. Moreover, electric power stored in the capacitor can be supplied to devices and the like that constitute the thermal power generation apparatus as needed.

In a ninth aspect, for example, the thermal power generation apparatus according to the first aspect may be arranged such that the electric power absorber further includes a power storage state detector that detects a power storage state of the capacitor.

According to the thermal power generation apparatus according to the ninth aspect, it is possible to grasp the state of the capacitor. This means that the capacitor can be safely used.

In a tenth aspect, for example, the thermal power generation apparatus according to the eighth or ninth aspect may be arranged such that the charge-discharge circuit includes a DC-DC converter.

The thermal power generation apparatus according to the tenth aspect can be realized with a simple configuration.

In an eleventh aspect, for example, the thermal power generation apparatus according to any one of the eighth through tenth aspects may be arranged such that the thermal power generation apparatus uses the direct-current power stored in the capacitor as power for activating the thermal power generation apparatus.

The thermal power generation apparatus according to the eleventh aspect can be activated even in a case where the inverter does not operate due to a power outage or the like. That is, the thermal power generation apparatus according to the eleventh aspect can operate autonomously.

In a twelfth aspect, for example, the thermal power generation apparatus according to any one of the eighth through eleventh aspects may be arranged such that the heat engine is a Rankine cycle engine including a pump that feeds a working fluid by pumping, a first heat exchanger that provides heat from the heat supply source to the working fluid, an expander, and a second heat exchanger that discharges heat from the working fluid; and the pump, the first heat exchanger, the expander, and the second heat exchanger are connected in this order.

In the twelfth aspect, the heat engine is a Rankine cycle engine. This means that the thermal power generation apparatus is a versatile device in which various thermal sources can be used. Moreover, this Rankine cycle engine includes a pump. The pump makes it possible to accurately adjust heat supplied to the expander.

In a thirteenth aspect, for example, the thermal power generation apparatus according to any one of the first through eleventh aspects may be arranged such that in a case where the specific mode is selected, the control circuit (i) controls the inverter to adjust the alternating-current power output from the inverter so that the direct-current voltage in the direct-current power line follows the target voltage, (ii) controls the electric power absorber to absorb at least part of the direct-current power, and (iii) controls the heat engine to adjust an amount of heat per unit time supplied to the heat engine.

In a fourteenth aspect, for example, the thermal power generation apparatus according to the thirteenth aspect may be arranged such that the amount of heat per unit time supplied to the heat engine in the specific mode is smaller than that in the normal mode.

The thermal power generation apparatus according to the fourteenth aspect generates, in the specific mode, alternating-current output power that is lower than that in the normal mode but is not zero. This makes switching from the specific mode to the normal mode easy.

In a fifteenth aspect, for example, the thermal power generation apparatus according to the fourteenth aspect may be arranged such that the amount of direct-current power absorbed by the electric power absorber in the specific mode is larger than that in the normal mode; and the amount of heat per unit time supplied to the heat engine in the specific mode is larger than zero and not more than that in the normal mode.

In the thermal power generation apparatus according to the fifteenth aspect, also in the specific mode, the amount of heat supplied to the power extractor is kept larger than zero. This makes switching from the specific mode to the normal mode easy.

In a sixteenth aspect, for example, the thermal power generation apparatus according to the eleventh aspect may be arranged such that the heat engine is a Rankine cycle engine including a pump that feeds a working fluid by pumping, a first heat exchanger that provides heat from the heat supply source to the working fluid, an expander, and a second heat exchanger that discharges heat from the working fluid; the pump, the first heat exchanger, the expander, and the second heat exchanger are connected in this order; and the control circuit adjusts an amount of heat per unit time supplied to the expander by the pump.

In the sixteenth aspect, the heat engine is a Rankine cycle engine. This means that the thermal power generation apparatus is a versatile device in which various thermal sources can be used. Moreover, this Rankine cycle engine includes a pump. The pump makes it possible to accurately adjust heat supplied to the expander.

In a seventeenth aspect, for example, the thermal power generation apparatus according to the thirteenth aspect may be arranged such that the heat engine is a Rankine cycle engine including a pump that feeds a working fluid by pumping, a first heat exchanger that provides heat from the heat supply source to the working fluid, an expander, and a second heat exchanger that discharges heat from the working fluid; the pump, the first heat exchanger, the expander, and the second heat exchanger are connected in this order; the Rankine cycle engine further includes a bypass pathway that bypasses the expander and a bypass valve provided in the bypass pathway; and the control circuit adjusts an amount of heat per unit time supplied to the expander by the pump and the bypass valve.

The Rankine cycle engine of the seventeenth aspect has a pump and a bypass valve. The bypass valve improves the adjustment accuracy and the adjustment response of heat supplied to the expander.

In an eighteenth aspect, for example, the thermal power generation apparatus according to any one of the first through seventeenth aspects may be arranged such that the heat engine includes an expander.

The thermal power generation apparatus according to the eighteenth aspect can be realized with a simple configuration.

A thermal power generation system according to a nineteenth aspect includes a thermal power generation apparatus according to any one of the first through eighteenth aspects; and a boiler which functions as the heat supply source and acquires the direct-current power from the direct-current power line that connects the converter and the inverter.

The thermal power generation system according to the nineteenth aspect has similar advantages to the thermal power generation apparatus according to the first aspect. The thermal power generation system according to the nineteenth aspect can be suitably used as a CHP (Combined Heat and Power) that supplies hot water and electricity. Moreover, in this thermal power generation system, the boiler can operate on the direct-current power of the direct-current power line. Accordingly, the electric power generated by the thermal power generation system can provide electric power for self consumption and provide electric power needed to operate the boiler (to secure hot water).

A thermal power generation system according to a twentieth aspect includes a thermal power generation apparatus according to any one of the first through eighteenth aspects; and a thermal source, exhaust heat from the thermal source being the heat supplied from the heat supply source.

The thermal power generation system according to the twentieth aspect has similar advantages to the thermal power generation apparatus according to the first aspect. Utilizing exhaust heat is desirable from the perspective of reducing environmental impact.

Configuration examples of the present disclosure are described below with reference to the drawings.

Configuration Example 1 of Thermal Power Generation Apparatus

FIG. 1 illustrates a thermal power generation apparatus 1 of Configuration Example 1. The thermal power generation apparatus 1 includes a heat engine 20, a power generator 3, a converter 4, an inverter 5, an electric power absorber 6, and a control circuit 7. The thermal power generation apparatus 1 is electrically connected to a commercial system 8.

Following is an outline of operation of the thermal power generation apparatus 1. The heat engine 20 generates mechanical power from heat emitted from a thermal energy source. The power generator 3 generates alternating-current-generated power $P_g$ from this mechanical power. The converter 4 generates direct-current power $P_{dc}$ from the alternating-current-generated power $P_g$. The inverter 5 generates alternating-current output power $P_o$ from at least part of the direct-current power $P_{dc}$. The alternating-current output power $P_o$ is supplied to the commercial system 8.

Heat Engine

The heat engine 20 includes a power extractor 24 and a supplied heat adjuster 21. The heat engine 20 is thermally connected to the thermal energy source.

The power extractor 24 extracts mechanical power from the heat supplied to the power extractor 24. That is, the power extractor 24 converts thermal energy into kinetic energy. The power extractor 24 may be, for example, an expander or an engine.

The supplied heat adjuster 21 adjusts the amount $H_s$ of heat per unit time supplied to the power extractor 24 (hereinafter sometimes referred to simply as the supplied heat amount $H_s$). That is, the supplied heat adjuster 21 adjusts the amount of thermal energy converted by the power extractor 24. The supplied heat adjuster 21 operates based on a command from the control circuit.

Power Generator and Converter

The power generator 3 is connected to the power extractor 24 of the heat engine 20. A rotor of the power generator 3 is rotated by the power extractor 24. That is, the power generator 3 generates the alternating-current-generated power $P_g$ from the mechanical power extracted by the power extractor 24. That is, the power generator 3 converts the kinetic energy generated in the power extractor 24 into electric energy.

The converter 4 is electrically connected to the power generator 3 via an alternating-current power line 12. The converter 4 generates the direct-current power $P_{dc}$ from the alternating-current-generated power $P_g$ generated by the power generator 3. The direct-current power $P_{dc}$ is transmitted to the inverter 5 through a direct-current power line 13. The converter 4 is electrically connected to the inverter 5 via the direct-current power line 13.

In the present configuration example, the control circuit creates a rotational speed command for the power generator 3. The rotational speed command is given to the converter 4. The converter 4 adjusts the rotational speed of the power generator 3 on the basis of the rotational speed command. As a result, the alternating-current-generated power $P_g$ and the direct-current power $P_{dc}$ are adjusted.

Inverter

The inverter 5 receives at least part of the direct-current power $P_{dc}$ generated by the converter 4. In the present configuration example, the inverter 5 receives direct-current power obtained by subtracting direct-current power absorbed by the electric power absorber 6 from the direct-current power $P_{dc}$. The inverter 5 generates the alternating-current output power $P_o$ from the received direct-current power. The alternating-current output power $P_o$ is supplied to the commercial system 8 via an alternating-current power line 14. The frequency of the alternating-current output power $P_o$ is set in accordance with the commercial system 8. The output voltage of the inverter 5 is also set in accordance with the commercial system 8. An electric current corresponding to the alternating-current output power $P_o$ and the output voltage flows into the commercial system 8.

Electric Power Absorber

The electric power absorber 6 is electrically connected to the converter 4 and the inverter 5 via the direct-current power line 13 and a branch power line 15. The branch power line 15 is branched from the direct-current power line 13. At least part of the direct-current power $P_{dc}$ (direct-current power $P_b$) transmitted from the converter 4 toward the inverter 5 is absorbed by the electric power absorber 6. An example of the electric power absorber 6 is illustrated in FIGS. 2 through 4.

Figure 2:
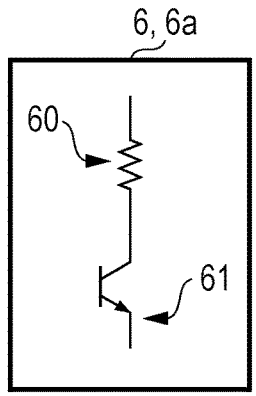
FIG. 2 is a view illustrating a configuration example of an electric power absorber.

The electric power absorber 6 (6a) illustrated in FIG. 2 includes a resistor 60 and a semiconductor switch 61. The resistor 60 consumes the direct-current power $P_b$. The semiconductor switch 61 adjusts the direct-current power $P_b$ absorbed by the electric power absorber 6a and consumed by the resistor 60 through an ON/OFF operation.

Figure 3:
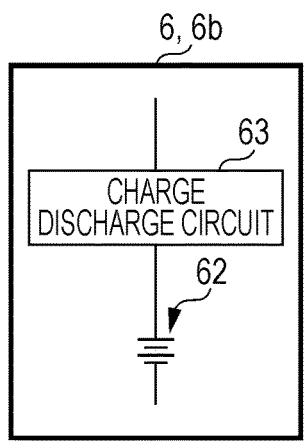
FIG. 3 is a view illustrating a configuration example of an electric power absorber.

The electric power absorber 6 (6b) illustrated in FIG. 3 includes a capacitor 62 and a charge-discharge circuit 63. The charge-discharge circuit 63 is electrically connected to the capacitor 62. The charge-discharge circuit 63 adjusts an electric current flowing into the capacitor 62 and an electric current flowing out of the capacitor 62. The direct-current power $P_b$ corresponding to such an adjusted electric current is absorbed by the electric power absorber 6b to charge the capacitor 62 or is discharged from the capacitor 62 so as to be released from the electric power absorber 6b. A specific example of the capacitor 62 is a secondary battery such as a lithium-ion battery or an electric double layer capacitor. A specific example of the charge-discharge circuit 63 has a DC-DC converter.

Figure 4:
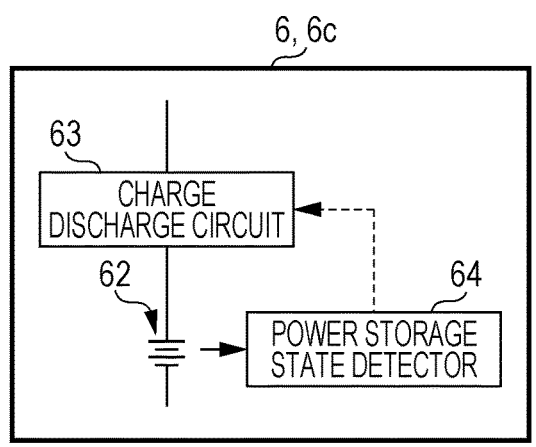
FIG. 4 is a view illustrating a configuration example of an electric power absorber.

The electric power absorber 6 (6c) illustrated in FIG. 4 includes a power storage state detector 64 in addition to the capacitor 62 and the charge-discharge circuit 63. The power storage state detector 64 detects a power storage state of the capacitor 62. In the present configuration example, a voltage range of the capacitor 62 in which charging and discharging of the capacitor 62 are allowed is preset. In a case where the power storage state detector 64 detects that the voltage of the capacitor 62 is within this voltage range, charging and discharging of the capacitor 62 are allowed. In a case where the power storage state detector 64 detects that the voltage of the capacitor 62 is higher than an upper limit of this voltage range, charging of the capacitor 62 is prohibited. In a case where the power storage state detector 64 detects that the voltage of the capacitor 62 is lower than a lower limit of this voltage range, discharging is prohibited. The power storage state detector 64 makes it possible to increase the reliability of the electric power absorber 6. Another example of the power storage state detector 64 is configured to be capable of detecting temperature, remaining battery level (SOC), or shape (bulge, pressure, and the like) of the capacitor. In a case where the power storage state detector 64 detects that the temperature, remaining battery level (SOC), or shape of the capacitor is within a predetermined range, charging and discharging of the capacitor 62 are allowed. In a case where the power storage state detector 64 detects that the temperature, remaining battery level (SOC), or shape of the capacitor is not within a predetermined range, charging and/or discharging of the capacitor 62 are/is prohibited.

It is also possible to employ an arrangement in which the direct-current power $P_b$ stored in the capacitor 62 of the electric power absorber 6b or 6c is used as power for activating the thermal power generation apparatus 1. According to this arrangement, the capacitor 62 functions as an emergency power source available during a power outage. This allows the thermal power generation apparatus 1 to be activated even in a case where the inverter 5 does not operate due to a power outage or the like. That is, the thermal power generation apparatus 1 can operate autonomously.

Control Circuit

The control circuit 7 selects an operation mode of the thermal power generation apparatus 1. The operation mode is selected from among a plurality of modes. The plurality of modes include a normal mode and a specific mode.

The control circuit 7 selects an operation mode on the basis of a voltage (system voltage) in the commercial system 8. Specifically, the control circuit 7 detects a timing of a voltage drop (voltage amplitude drop) and a timing of voltage recovery (voltage amplitude recovery) in the commercial system 8 on the basis of an electric parameter detected in the direct-current power line 13 or the alternating-current power line 14 for transmitting the alternating-current output power $P_o$. The control circuit 7 switches the operation mode from the normal mode to the specific mode upon detection of a voltage drop in the commercial system 8. The control circuit 7 switches the operation mode from the specific mode to the normal mode upon detection of voltage recovery in the commercial system 8. In the present configuration example, an electric parameter pa11 is a voltage itself of the commercial system 8. The electric parameter pa11 is acquired at an interconnection point 11 of the alternating-current power line 14.

In the present configuration example, in a case where the control circuit 7 does not detect voltage recovery in the commercial system 8 within a limited time after switching of the operation mode from the normal mode to the specific mode, the thermal power generation apparatus 1 sets the alternating-current output power $P_o$ output from the inverter 5 to zero and/or breaks the connection with the commercial system 8. Moreover, the thermal power generation apparatus 1 reduces the amount of heat $H_s$ per unit time supplied to the power extractor 24 so as to set the alternating-current-generated power $P_g$ generated by the power generator 3 and the direct-current power $P_{dc}$ generated by the converter 4 to zero.

In the normal mode, the thermal power generation apparatus 1 can adjust the alternating-current output power $P_o$ output from the inverter 5. This adjustment allows a direct-current voltage $V_{dc}$ in the direct-current power line 13 to follow a target voltage. Specifically, in a case where the direct-current voltage $V_{dc}$ is higher than the target voltage, the thermal power generation apparatus 1 can increase the alternating-current output power $P_o$. In a case where the direct-current voltage $V_{dc}$ is lower than the target voltage, the thermal power generation apparatus 1 can reduce the alternating-current output power $P_o$. Note that "adjusting the alternating-current output power $P_o$" is a concept that encompasses adjusting an output electric current from the inverter 5.

In the present configuration example, the target voltage is a constant voltage that does not substantially change over time. By causing the direct-current voltage $V_{dc}$ to follow the target voltage, the heat engine 20 can be operated within the scope of specifications. For example, in a case where the power extractor 24 is an expander, the rotational speed of the expander is kept within the scope of specifications without being excessively increased or decreased. However, the target voltage may change over time. The target voltage may be set in accordance with the voltage in the commercial system 8. In this case, the target voltage can be increased in a case where the voltage in the commercial system 8 is high, whereas the target voltage can be decreased in a case where the voltage in the commercial system 8 is low. This makes it possible to improve electric power conversion efficiency of the inverter 5.

In the normal mode, the thermal power generation apparatus 1 can adjust the alternating-current-generated power $P_g$ and the direct-current power $P_{dc}$ by adjusting the amount of heat $H_s$ per unit time supplied to the power extractor 24. In the present configuration example, the supplied heat adjuster 21 adjusts the supplied heat amount $H_s$.

The thermal power generation apparatus 1 can adjust the direct-current power $P_b$ absorbed by the electric power absorber 6. The thermal power generation apparatus 1 can adjust the amount of heat $H_s$ supplied to the power extractor 24. In the specific mode, the direct-current voltage $V_{dc}$ in the direct-current power line 13 follows the target voltage through one or both of these adjustments. Specifically, in a case where the direct-current voltage $V_{dc}$ is higher than the target voltage, the thermal power generation apparatus 1 can increase the direct-current power $P_b$. In a case where the direct-current voltage $V_{dc}$ is lower than the target voltage, the thermal power generation apparatus 1 can decrease the direct-current power $P_b$. Furthermore, in a case where the direct-current voltage $V_{dc}$ is higher than the target voltage, the thermal power generation apparatus 1 can decrease the amount of heat $H_s$ per unit time supplied to the power extractor 24. In a case where the direct-current voltage $V_{dc}$ is lower than the target voltage, the thermal power generation apparatus 1 can increase the amount of heat $H_s$ per unit time supplied to the power extractor 24. Note that "adjusting the direct-current power $P_b$" is a concept that encompasses adjusting an electric current flowing into the electric power absorber 6.

Specifically, in the present configuration example, the amount of alternating-current output power $P_o$ output from the inverter 5 in the specific mode is larger than zero and smaller than that in the normal mode. The amount of direct-current power $P_b$ absorbed by the electric power absorber 6 in the specific mode is larger than that in the normal mode and/or the amount of heat $H_s$ per unit time supplied to the power extractor 24 in the specific mode is smaller than that in the normal mode.

More specifically, the amount of direct-current power $P_b$ absorbed by the electric power absorber 6 in the specific mode is larger than that in the normal mode. The amount of heat $H_s$ per unit time supplied to the power extractor 24 in the specific mode is larger than zero and not more than that in the normal mode. Further more specifically, the amount of heat $H_s$ per unit time supplied to the power extractor 24 in the specific mode is the same as that in the normal mode.

The control circuit may be any control circuit that has a control function. The control circuit includes an arithmetic processor (not illustrated) and a storage section (not illustrated) in which a control program is stored. Examples of the arithmetic processor include an MPU and a CPU. Examples of the storage section include a memory. The control circuit may be realized by a single control circuit that performs integrated control or may be realized by a plurality of control circuits that perform distributed control in cooperation with each other (the same applies to control circuits in the other embodiments and modifications thereof).

Control Performed by Thermal Power Generation Apparatus

An example of control performed by the thermal power generation apparatus 1 is described with reference to FIG. 5. The flow chart of FIG. 5 starts from a state where the operation mode is set to the normal mode.

In Step S101, an effective value $V_{rms}$ (hereinafter sometimes referred to simply as a voltage $V_{rms}$) of a voltage of the commercial system 8 is acquired at the interconnection point 11.

In Step S102, it is determined whether or not the voltage $V_{rms}$ is lower than a threshold voltage $V_{rms1}$. In a case where it is determined that the voltage $V_{rms}$ is lower than the threshold voltage $V_{rms1}$, the processing proceeds to Step S103. In a case where it is determined that the voltage $V_{rms}$ is not less than the threshold voltage $V_{rms1}$, the processing returns to Step S101. That is, the operation mode is kept at the normal mode.

In Step S103, the operation mode is switched from the normal mode to the specific mode.

In Step S104, an elapsed time $t_e$ is set to zero. The elapsed time $t_e$ is a time elapsed from switching of the operation mode from the normal mode to the specific mode.

In Step S105, it is determined whether or not the elapsed time $t_e$ is not more than a limited time $t_{e1}$. In a case where it is determined that the elapsed time $t_e$ is not more than the limited time $t_{e1}$, the processing proceeds to Step S106. In a case where it is determined that the elapsed time $t_e$ is longer than the limited time $t_{e1}$, the alternating-current output power $P_o$ is set to zero (Step S109), and operation of the thermal power generation apparatus 1 is stopped.

In Step S106, the voltage $V_{rms}$ is acquired at the interconnection point 11.

In Step S107, it is determined whether or not the voltage $V_{rms}$ is not less than the threshold voltage $V_{rms1}$. In a case where it is determined that the voltage $V_{rms}$ is not less than the threshold voltage $V_{rms1}$, the operation mode is switched from the specific mode to the normal mode (Step S108), and then the processing returns to Step S101. In a case where it is determined that the voltage $V_{rms}$ is lower than the threshold voltage $V_{rms1}$, the processing returns to Step S105. That is, the operation mode is kept at the specific mode.

In the present configuration example, the effective value $V_{rms}$ of the voltage of the commercial system 8 is acquired in Step S101 and Step S106, and the voltage $V_{rms}$ is compared with the threshold voltage $V_{rms1}$ in Step S102 and Step S107. However, it is also possible to acquire the amplitude of the voltage of the commercial system 8 in Step S101 and Step S106 and to compare the amplitude with another threshold value in Step S102 and Step S107. That is, these steps are not limited to specific ones, provided that a timing of a voltage drop in the commercial system 8 and a timing of voltage recovery in the commercial system 8 can be detected. Step S102 and Step S107 can be considered as steps for comparing the amount of change from a steady-state value of the voltage $V_{rms}$ with a threshold value.

Figure 5:
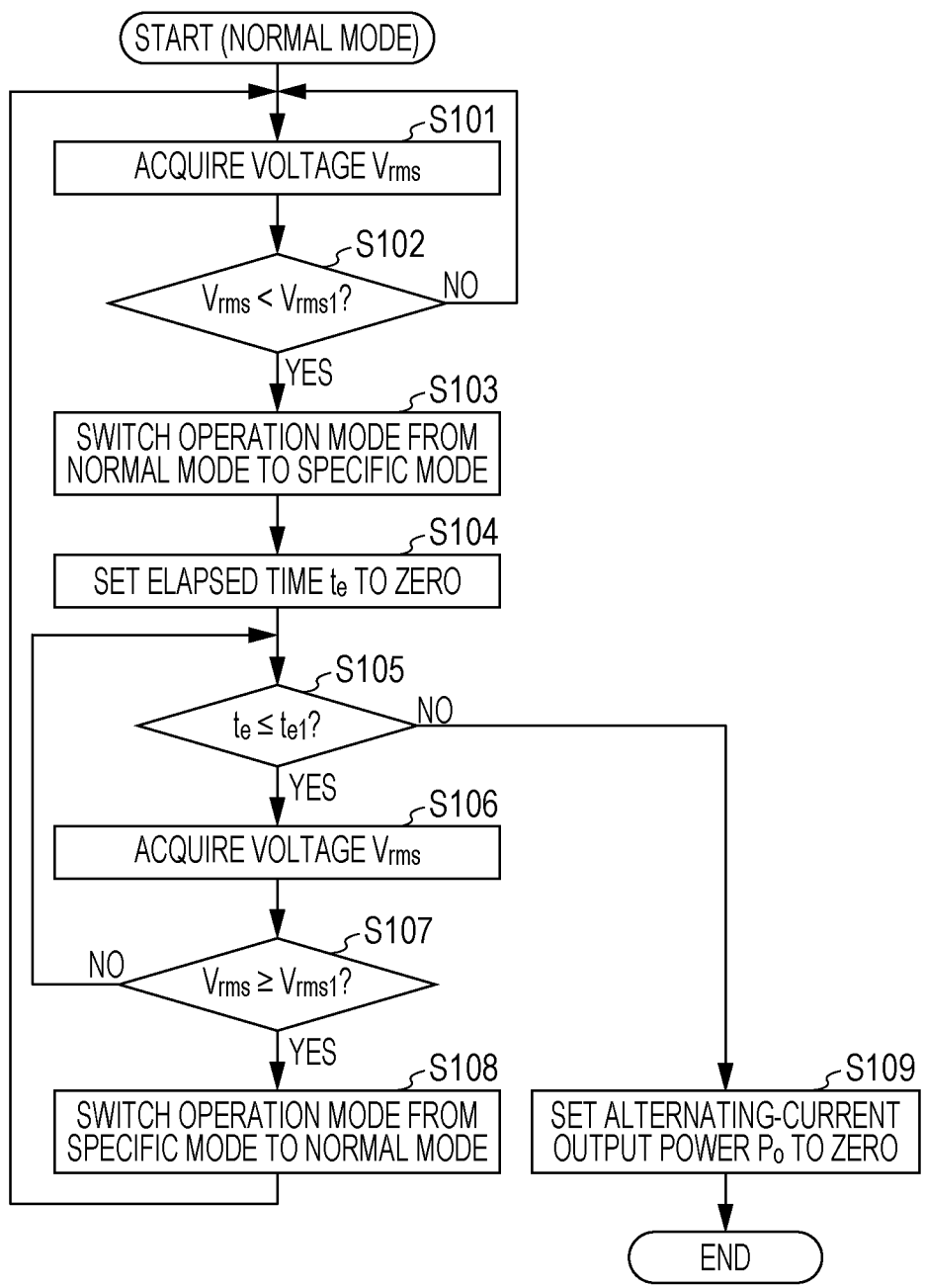
FIG. 5 is a flow chart for explaining control performed by the thermal power generation apparatus of FIG. 1.

Control in Case where Voltage Recovery is Detected within Limited Time from Voltage Drop As illustrated in FIG. 5, in the thermal power generation apparatus 1, there is a case where the operation mode that has been set to the normal mode is switched to the specific mode once (Step S103) and is then switched to the normal mode (Step S108). A time chart showing this case is illustrated in FIG. 6A.

In the upper portion of FIG. 6A, the effective value $V_{rms}$ of the voltage of the commercial system 8 is indicated by the solid line. The voltage $V_{rms}$ is initially maintained at a rated voltage $V_{rms0}$. At a time $t_0$, the voltage $V_{rms}$ decreases to less than the threshold voltage $V_{rms1}$. Accordingly, at the time $t_0$, the operation mode is switched from the normal mode to the specific mode (Steps S102 and S103 in FIG. 5). Next, at a time $t_1$, the voltage $V_{rms}$ recovers to not less than the threshold voltage $V_{rms1}$. The time $t_1$ is earlier than a time $t_2$, which is a time after elapse of a limited time $t_{e1}$ from the time $t_0$. Accordingly, at the time $t_1$, the operation mode is switched from the specific mode to the normal mode (Steps S105 through S108).

The thick line in the lower portion of FIG. 6A indicates the direct-current power $P_{dc}$ output from the converter 4. The shaded portion indicates the alternating-current output power (regenerative electric power) $P_o$ output from the inverter 5. The white portion surrounded by the thick line and the shaded portion indicates the direct-current power $P_b$ absorbed by the electric power absorber 6.

Until the time $t_0$ (the normal mode), the alternating-current output power $P_o$ from the inverter 5 (the output electric current from the inverter 5) is adjusted so that the direct-current voltage $V_{dc}$ follows the target voltage.

During a period from the time $t_0$ to the time $t_1$ (the specific mode), the thermal power generation apparatus 1 causes the inverter 5 to keep the output electric current from the inverter 5 at the output electric current at the time $t_0$ (>0 A). Specifically, an electric current command is given to the inverter 5 so that such an output electric current is obtained. In accordance with this, adjustment of the direct-current voltage $V_{dc}$ is performed by a member other than the inverter 5. In this example, the direct-current power $P_b$ absorbed by the electric power absorber 6 is adjusted so that the direct-current voltage $V_{dc}$ follows the target voltage.

At the time $t_1$, the operation mode returns to the normal mode, and adjustment of the alternating-current output power $P_o$ for causing the direct-current voltage $V_{dc}$ to follow the target voltage is resumed. However, in this example, the direct-current power $P_b$ is not rapidly decreased. Instead, the thermal power generation apparatus 1 gradually decreases the direct-current power $P_b$ to zero over a time α. This makes it possible to prevent damage on devices that constitute the thermal power generation apparatus 1. Moreover, it is possible to prevent damage of a system interconnection device (e.g., load in an alternating-current system) connected to the thermal power generation apparatus 1. After time $t_1$+α, the thermal power generation apparatus 1 operates in a similar manner to that before the time $t_0$.

Control in Case where Voltage Recovery is not Detected within Limited Time from Voltage Drop As illustrated in FIG. 5, in the thermal power generation apparatus 1, there is a case where the operation mode that has been set to the normal mode is switched to the specific mode (Step S103), then the alternating-current output power $P_o$ is set to zero (Step S109), and operation of the thermal power generation apparatus 1 is stopped. A time chart showing this case is illustrated in FIG. 6B.

In the example of FIG. 6B, the effective value $V_{rms}$ of the voltage of the commercial system 8 is initially kept at a rated voltage $V_{rms0}$. At the time $t_0$, the voltage $V_{rms}$ decreases to less than the threshold voltage $V_{rms1}$. Accordingly, the operation mode is switched from the normal mode to the specific mode at the time $t_0$ (Steps S102 and S103 of FIG. 5). In this example, a state where the voltage $V_{rms}$ is less than the threshold voltage $V_{rms1}$ is kept during a period from the time $t_0$ to the time $t_2$. That is, the voltage $V_{rms}$ does not recover to not less than the threshold voltage $V_{rms1}$ even after elapse of the limited time $t_{e1}$ from the time $t_0$. Accordingly, at the time $t_2$, the alternating-current output power $P_o$ is set to zero, and operation of the thermal power generation apparatus 1 is stopped (Steps S105 through S107, and S109).

In the example of FIG. 6B, the thermal power generation apparatus 1 causes the inverter 5 to operate in a similar manner to that of FIG. 6A until the time $t_0$ (the normal mode).

During the period from the time $t_0$ to the time $t_2$ (the specific mode), the thermal power generation apparatus 1 causes the inverter 5 and the electric power absorber 6 to operate in a similar manner to that during the period from the time $t_0$ to the time $t_1$ in FIG. 6A.

During a period from the time $t_2$ to the time $t_3$, the thermal power generation apparatus 1 adjusts the direct-current power $P_b$ so that the direct-current voltage $V_{dc}$ follows the target voltage. The thermal power generation apparatus 1 sets the alternating-current output power $P_o$ to zero at the time $t_2$. The thermal power generation apparatus 1 starts decreasing the direct-current power $P_{dc}$ from the time $t_2$. The direct-current power $P_{dc}$ becomes zero at the time $t_3$, which is a time after elapse of a time β (>0 second) from the time $t_2$, and the thermal power generation apparatus 1 is stopped.

As described with reference to FIGS. 6A and 6B, in a case where the voltage $V_{rms}$ recovers within the limited time $t_{e1}$ after a drop of the effective value $V_{rms}$ of the voltage of the commercial system 8, the thermal power generation apparatus 1 resumes operation in the normal mode. That is, in a case where the voltage $V_{rms}$ just temporarily decreases, power supply to the commercial system 8 is promptly resumed. Meanwhile, in a case where the voltage $V_{rms}$ does not recover within the limited time $t_{e1}$, the thermal power generation apparatus 1 sets the alternating-current output power $P_o$ to zero, breaks the connection with the commercial system 8, and sets the direct-current power $P_{dc}$ to zero. This prevents the alternating-current output power $P_o$ from being output from the thermal power generation apparatus 1 and prevents an excessive direct-current power $P_{dc}$ from damaging the devices inside the thermal power generation apparatus 1.

In the example of FIGS. 6A and 6B, in the specific mode, the amount of heat $H_s$ per unit time supplied to the power extractor 24, the alternating-current-generated power $P_g$ output from the power generator 3, and the direct-current power $P_{dc}$ output from the converter 4 are kept at the same levels as those in the normal mode. Furthermore, the amount of alternating-current output power $P_o$ is kept smaller than that in the normal mode but larger than zero. These characteristics contribute to promptly recovering the alternating-current-generated power $P_g$ at the time of recovery of the voltage $V_{rms}$.

The rated voltage $V_{rms0}$ is, for example, 200 V. The threshold voltage $V_{rms1}$ ($<V_{rms0}$) is, for example, 160 V. The limited time $t_{e1}$ is, for example, 0.3 seconds. The time $\alpha$ can be set to a value that makes it possible to prevent damage of the devices and to fulfill the FRT requirements (described later). The time $\alpha$ can be, for example, within 0.1 to 1 second. The time $\beta$ can be, for example, 1 second. These values are set in consideration of safety of the apparatus or the code.

The thermal power generation apparatus 1 can be suitably used as a dispersed power source apparatus for the following reasons. The thermal power generation apparatus 1 of the present configuration example can switch the operation mode in accordance with the voltage of the commercial system 8 by using the control circuit 7. In the thermal power generation apparatus 1, even in a case where the operation mode is switched, the function of causing the direct-current voltage in the direct-current power line 13 to follow the target voltage is not lost.

Furthermore, in the example of FIGS. 6A and 6B, in the specific mode, the supplied heat amount Hs, the alternating-current-generated power $P_g$, and the direct-current power $P_{dc}$ are kept at the same levels as those in the normal mode. Furthermore, the amount of alternating-current output power $P_o$ is kept smaller than that in the normal mode but larger than zero. These characteristics contribute to promptly recovering the alternating-current output power $P_o$ at the time of recovery of the voltage of the commercial system 8. That is, these characteristics makes it easy for the thermal power generation apparatus 1 to fulfill the FRT requirements.

Configuration Example 2 of Thermal Power Generation Apparatus

The following describes a thermal power generation apparatus of Configuration Example 2. Note that elements similar to those in Configuration Example 1 are given identical reference signs and are not explained repeatedly.

Figure 7:
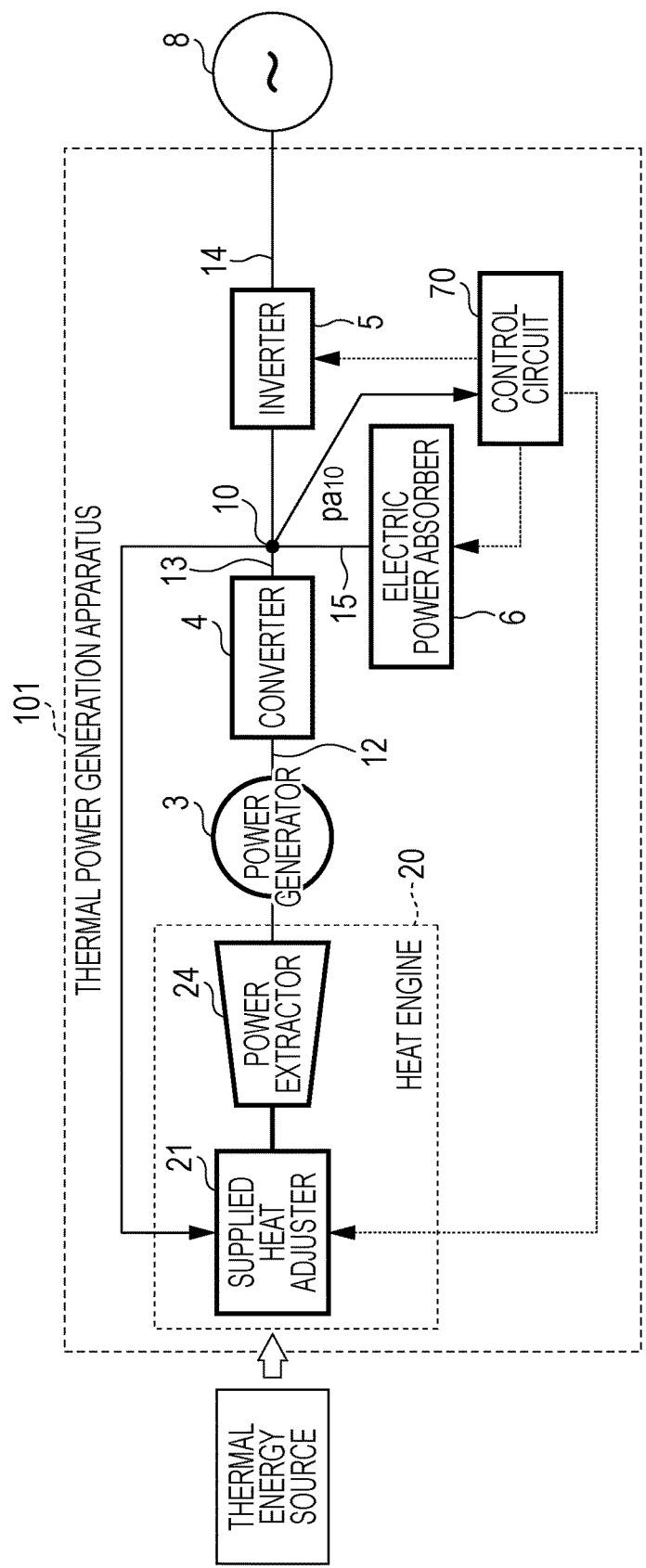
FIG. 7 is a view illustrating a configuration example of a thermal power generation apparatus.

A thermal power generation apparatus 101 illustrated in FIG. 7 includes a control circuit 70 instead of the control circuit 7.

The control circuit 70 uses an electric parameter $pa_{10}$. The electric parameter $pa_{10}$ is a direct-current voltage $V_{dc}$. The electric parameter $pa_{10}$ is acquired at a connection point 10 of a direct-current power line 13. A fluctuation of a voltage of a commercial system 8 is reflected in the direct-current voltage $V_{dc}$. It is therefore possible to grasp the fluctuation of the voltage of the commercial system 8 by using the direct-current voltage $V_{dc}$.

Control Performed by Thermal Power Generation Apparatus

An example of control performed by the thermal power generation apparatus 101 is described below with reference to FIG. 8.

In Step S201, the direct-current voltage $V_{dc}$ is acquired at the connection point 10.

In Step S202, it is determined whether or not the direct-current voltage $V_{dc}$ is higher than a threshold voltage $V_{dc1}$. In a case where it is determined that the direct-current voltage $V_{dc}$ is higher than the threshold voltage $V_{dc1}$, the processing proceeds to Step S103. In a case where it is determined that the direct-current voltage $V_{dc}$ is not more than the threshold voltage $V_{dc1}$, the processing returns to Step S201. That is, the operation mode is kept at the normal mode.

In Step S206, the direct-current voltage $V_{dc}$ is acquired at the connection point 10.

In Step S207, it is determined whether or not the direct-current voltage $V_{dc}$ is lower than a threshold voltage $V_{dc2}$. In a case where it is determined that the direct-current voltage $V_{dc}$ is lower than the threshold voltage $V_{dc2}$, the operation mode is switched from the specific mode to the normal mode (Step S108), and the processing returns to Step S201. In a case where it is determined that the direct-current voltage $V_{dc}$ is not less than the threshold voltage $V_{dc2}$, the processing returns to Step S105. That is, the operation mode is kept at the specific mode.

Figure 8:
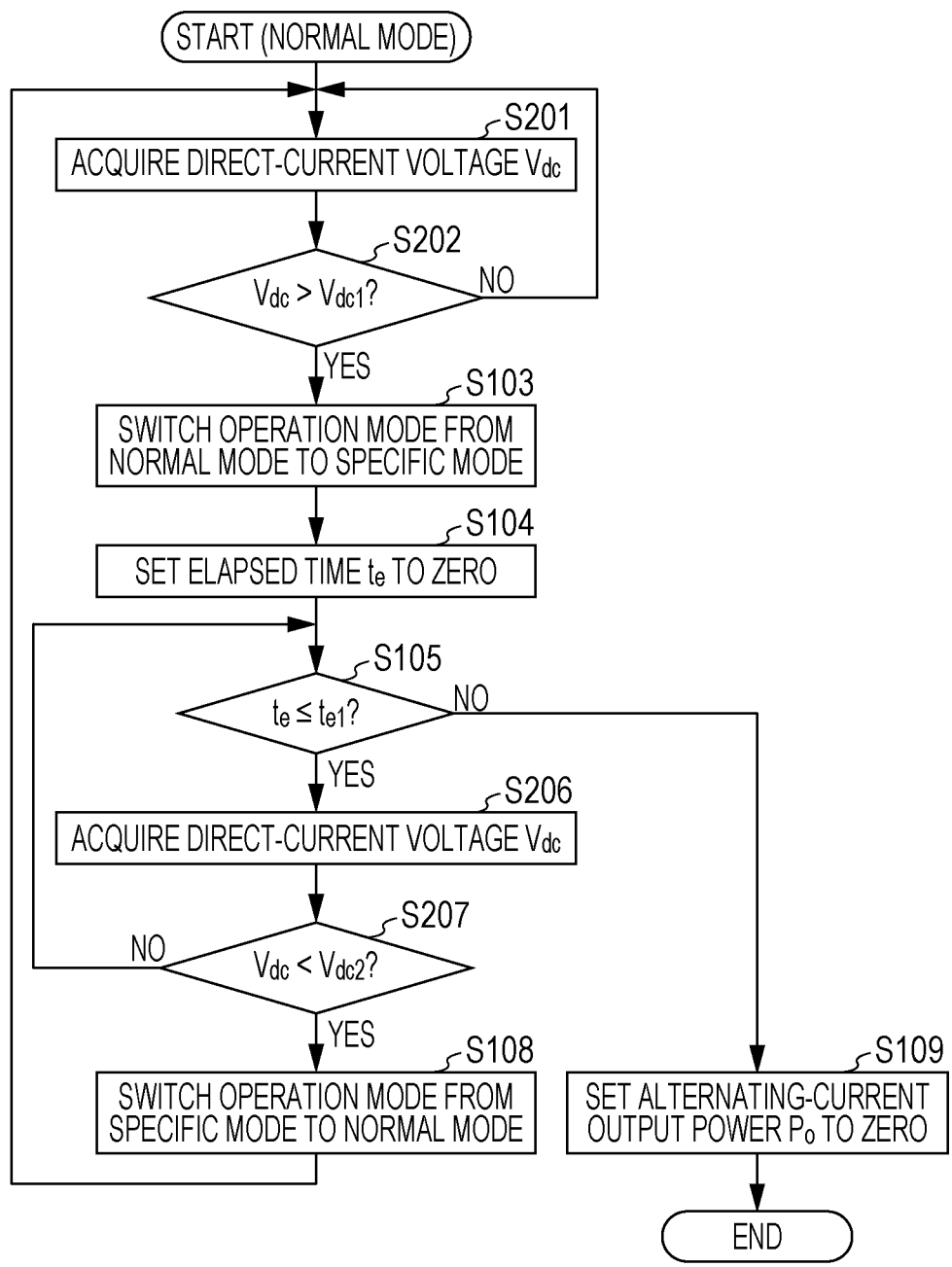
FIG. 8 is a flow chart for explaining control performed by the thermal power generation apparatus of FIG. 7.

Control in Case where Voltage Recovery is Detected within Limited Time from Voltage Drop As illustrated in FIG. 8, in the thermal power generation apparatus 101, there is a case where the operation mode that has been set to the normal mode is switched to the specific mode once (Step S103) and is then switched to the normal mode (Step S108). A time chart showing this case is illustrated in FIG. 9A.

Figure 9A:
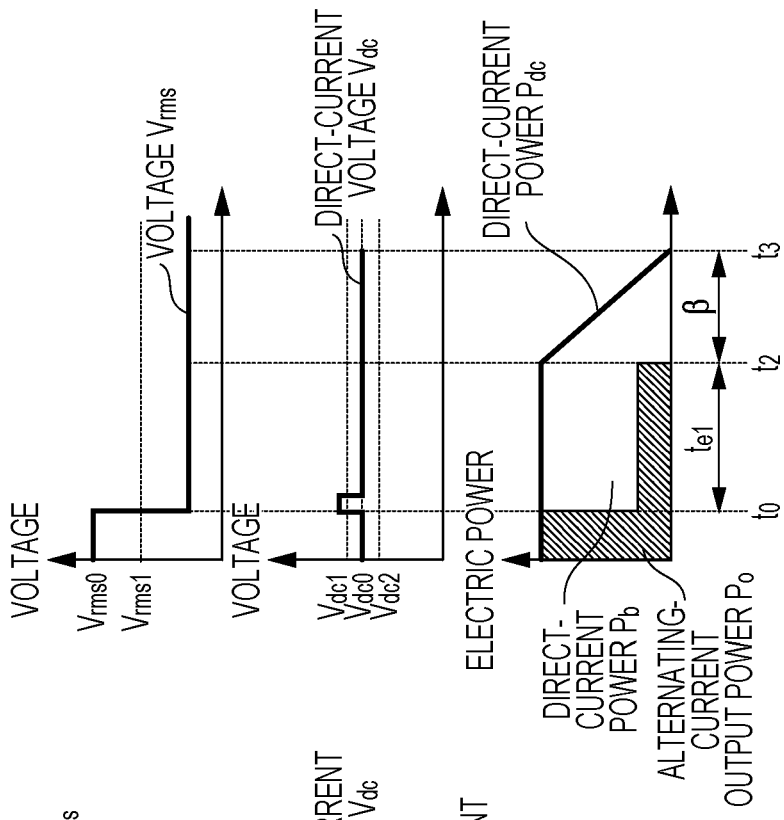
FIGS. 9A and 9B are time charts for explaining control performed by the thermal power generation apparatus of FIG. 7.

In the middle portion of FIG. 9A, the direct-current voltage $V_{dc}$ is indicated by the solid line. The direct-current voltage $V_{dc}$ is initially kept at a target voltage $V_{dc0}$. At a time $t_0$, the direct-current voltage $V_{dc}$ is higher than the threshold voltage $V_{dc1}$. Accordingly, at the time $t_0$, the operation mode is switched from the normal mode to the specific mode (Steps S202 and S103 in FIG. 8). Next, at a time $t_1$, the direct-current voltage $V_{dc}$ is lower than the threshold voltage $V_{dc2}$. The time $t_1$ is earner than a time $t_2$, which is a time after elapse of a limited time $t_{e1}$ from the time $t_0$. Accordingly, at the time $t_1$, the operation mode is switched from the specific mode to the normal mode (Steps S105, S206, S207, and S108).

Control in Case where Voltage Recovery is not Detected within Limited Time from Voltage Drop As illustrated in FIG. 8, in the thermal power generation apparatus 101, there is a case where the operation mode that has been set to the normal mode is switched to the specific mode (Step S103), then alternating-current output power $P_o$ is set to zero (Step S109), and operation of the thermal power generation apparatus 101 is stopped. A time chart showing this case is illustrated in FIG. 9B.

Figure 9B:
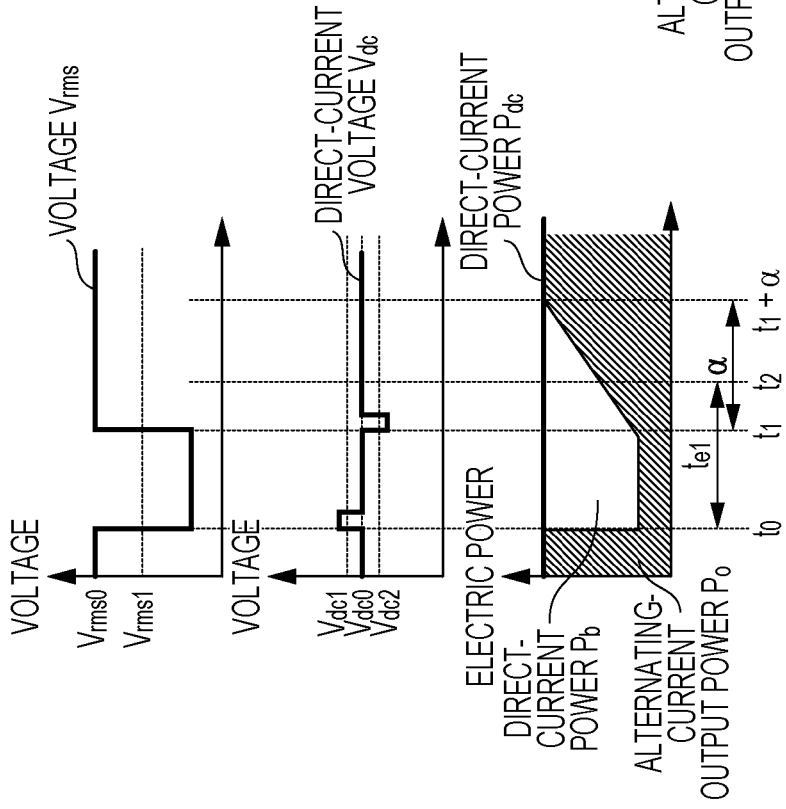

In the example of FIG. 9B, the direct-current voltage $V_{dc}$ is initially kept at the target voltage $V_{dc0}$. At the time $t_0$, the direct-current voltage $V_{dc}$ is higher than the threshold voltage $V_{dc1}$. Accordingly, at the time $t_0$, the operation mode is switched from the normal mode to the specific mode (Steps S202 and S103 of FIG. 8). In this example, a state where the direct-current voltage $V_{dc}$ is not less than the threshold voltage $V_{dc2}$ is kept during a period from the time $t_0$ to the time $t_2$. Accordingly, at the time $t_2$, the alternating-current output power $P_o$ is set to zero, and operation of the thermal power generation apparatus 101 is stopped (Steps S105, S109, S206, and S207).

According to the example of FIGS. 9A and 9B, it is possible to obtain similar effects to those in the example of FIGS. 6A and 6B.

$V_{dc0}$ is, for example, 350 V. $V_{dc1}$ is, for example, 370 V. $V_{dc2}$ is, for example, 330 V. That is, $V_{dc1} > V_{dc0} > V_{dc2}$. These values are set in consideration of safety of the apparatus and the code.

Configuration Example 3 of Thermal Power Generation Apparatus

The following describes a thermal power generation apparatus of Configuration Example 3. Note that elements that are similar to those in Configuration Example 2 are given identical reference signs and are not explained repeatedly.

Figure 10:
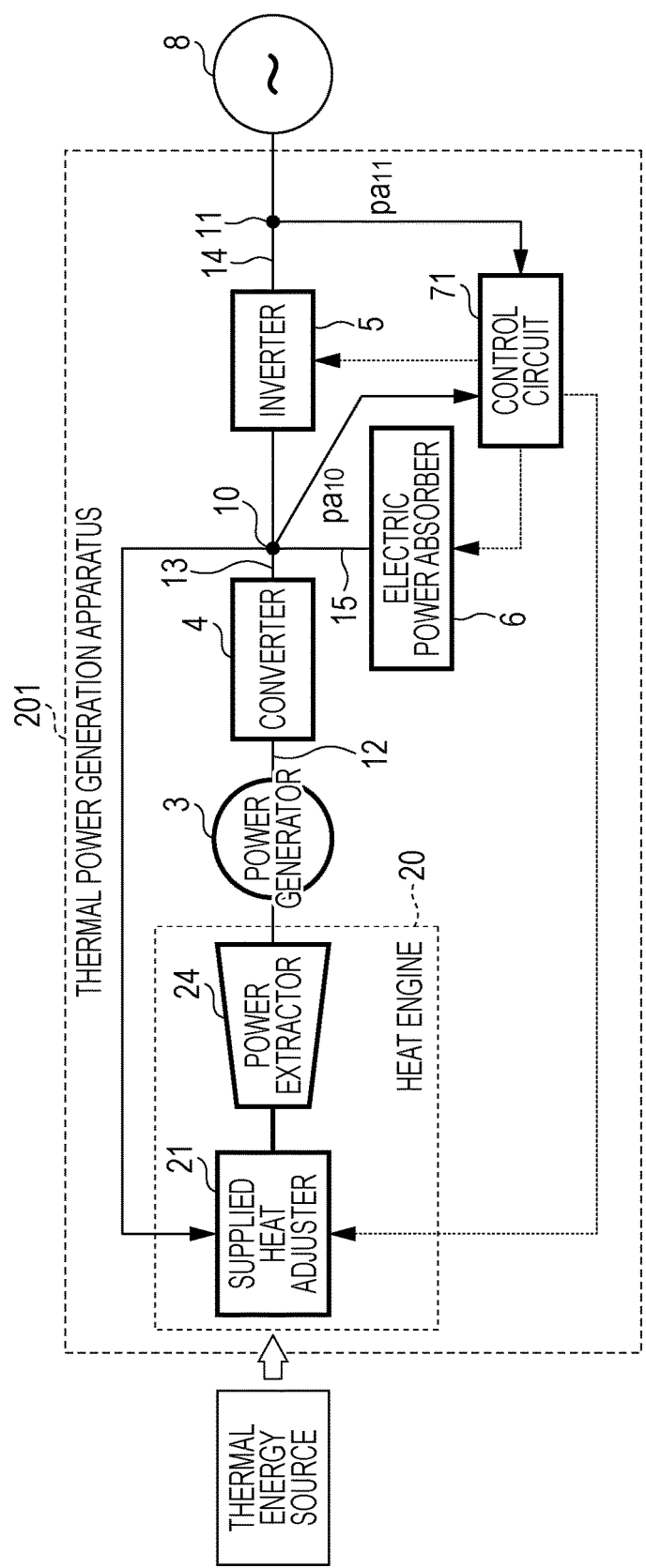
FIG. 10 is a view illustrating a configuration example of a thermal power generation apparatus.

A thermal power generation apparatus 201 illustrated in FIG. 10 includes a control circuit 71 instead of the control circuit 70.

The control circuit 71 detects a timing of a voltage drop and a timing of voltage recovery in the commercial system 8 by using the electric parameter $pa_{11}$ (the voltage of the commercial system 8) described in Configuration Example 1 and the electric parameter $pa_{10}$ (direct-current voltage $V_{dc}$) described in Configuration Example 2.

Control Performed by Thermal Power Generation Apparatus

An example of control performed by the thermal power generation apparatus 201 is described with reference to FIG. 11.

In Step S306, an effective value $V_{rms}$ of the voltage of the commercial system 8 is acquired at an interconnection point 11. The direct-current voltage $V_{dc}$ is acquired at a connection point 10.

In Step S307, it is determined whether or not a voltage $V_{rms}$ is not less than a threshold voltage $V_{rms1}$ and whether or not the direct-current voltage $V_{dc}$ is lower than a threshold voltage $V_{dc2}$. In a case where it is determined that the voltage $V_{rms}$ is not less than the threshold voltage $V_{rms1}$ or that the direct-current voltage $V_{dc}$ is lower than the threshold voltage $V_{dc2}$, the operation mode is switched from the specific mode to the normal mode (Step S108), and the processing returns to Step S201. In a case where it is determined that the voltage $V_{rms}$ is lower than the threshold voltage $V_{rms1}$ and the direct-current voltage $V_{dc}$ is not less than the threshold voltage $V_{dc2}$, the processing returns to Step S105. That is, the operation mode is kept at the specific mode.

Figure 11:
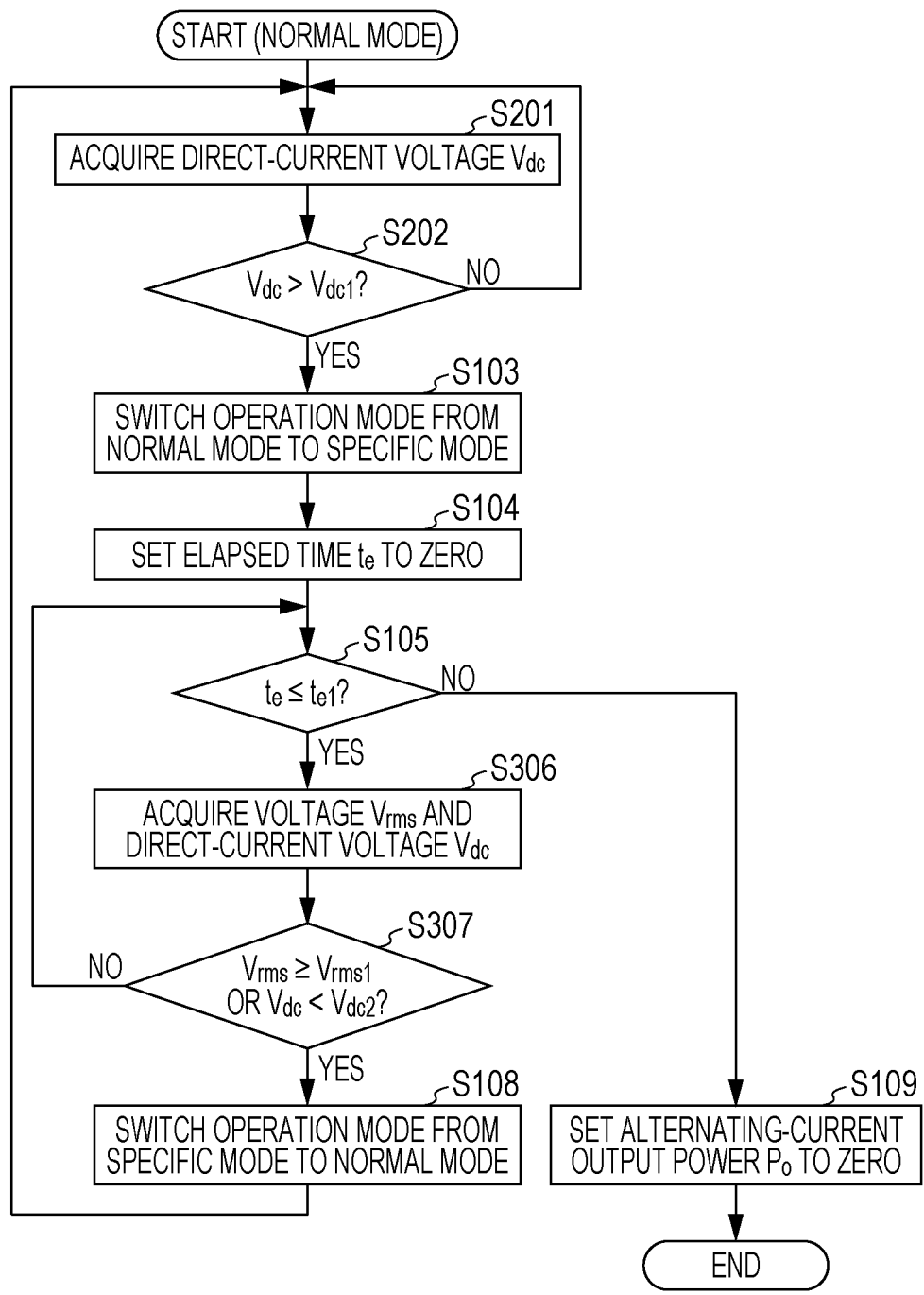
FIG. 11 is a flow chart for explaining control performed by the thermal power generation apparatus of FIG. 10.

Control in Case where Voltage Recovery is Detected within Limited Time from Voltage Drop As illustrated in FIG. 11, in the thermal power generation apparatus 201, there is a case where the operation mode that has been set to the normal mode is switched to the specific mode once (Step S103) and is then switched to the normal mode (Step S108). A time chart showing this case is illustrated in FIG. 12A.

The direct-current voltage $V_{dc}$ is initially kept at a target voltage $V_{dc0}$. At a time $t_0$, the direct-current voltage $V_{dc}$ is higher than the threshold voltage $V_{dc1}$. Accordingly, at the time $t_0$, the operation mode is switched from the normal mode to the specific mode (Steps S202 and S103 of FIG. 11). Next, at a time $t_1$, the voltage $V_{rms}$ recovers to not less than the threshold voltage $V_{rms1}$. The time $t_1$ is earlier than a time $t_2$, which is a time after elapse of a limited time $t_{e1}$ from the time $t_0$. Accordingly, at the time $t_1$, the operation mode is switched from the specific mode to the normal mode (Steps S105, S306, S307, and S108).

Control in Case where Voltage Recovery is not Detected within Limited Time from Voltage Drop As illustrated in FIG. 11, in the thermal power generation apparatus 201, there is a case where the operation mode that has been set to the normal mode is switched to the specific mode (Step S103), and then alternating-current output power $P_o$ is set to zero (Step S109), and operation of the thermal power generation apparatus 201 is stopped. A time chart showing this case is illustrated in FIG. 12B.

In the example of FIG. 12B, the direct-current voltage $V_{dc}$ is initially kept at the target voltage $V_{dc0}$. At the time $t_0$, the direct-current voltage $V_{dc}$ is higher than the threshold voltage $V_{dc1}$. Accordingly, at the time $t_0$, the operation mode is switched from the normal mode to the specific mode (Steps S202 and S103 of FIG. 11). In this example, a state where the voltage $V_{rms}$ is less than the threshold voltage $V_{rms1}$ and the direct-current voltage $V_{dc}$ is not less than the threshold voltage $V_{dc2}$ is kept during a period from the time $t_0$ to the time $t_2$. That is, it is determined that the voltage $V_{rms}$ does not recover to not less than the threshold voltage $V_{rms1}$ after a limited time $t_{e1}$ from the time $t_0$. Accordingly, at the time $t_2$, the alternating-current output power $P_o$ is set to zero, and operation of the thermal power generation apparatus 201 is stopped (Steps S105, S109, S306, and S307).

There is a case where even if the voltage of the commercial system 8 recovers, the direct-current voltage $V_{dc}$ undergoes only a small fluctuation or the direct-current voltage $V_{dc}$ undergoes almost no fluctuation. Even in such a case, the thermal power generation apparatus 201 can resume operation in the normal mode on the basis of the voltage $V_{rms}$.

Configuration Example 4 of Thermal Power Generation Apparatus

The following describes a thermal power generation apparatus of Configuration Example 4. In Configuration Example 4, elements that are similar to those in Configuration Example 1 are given identical reference signs and are not explained repeatedly.

Figure 13:
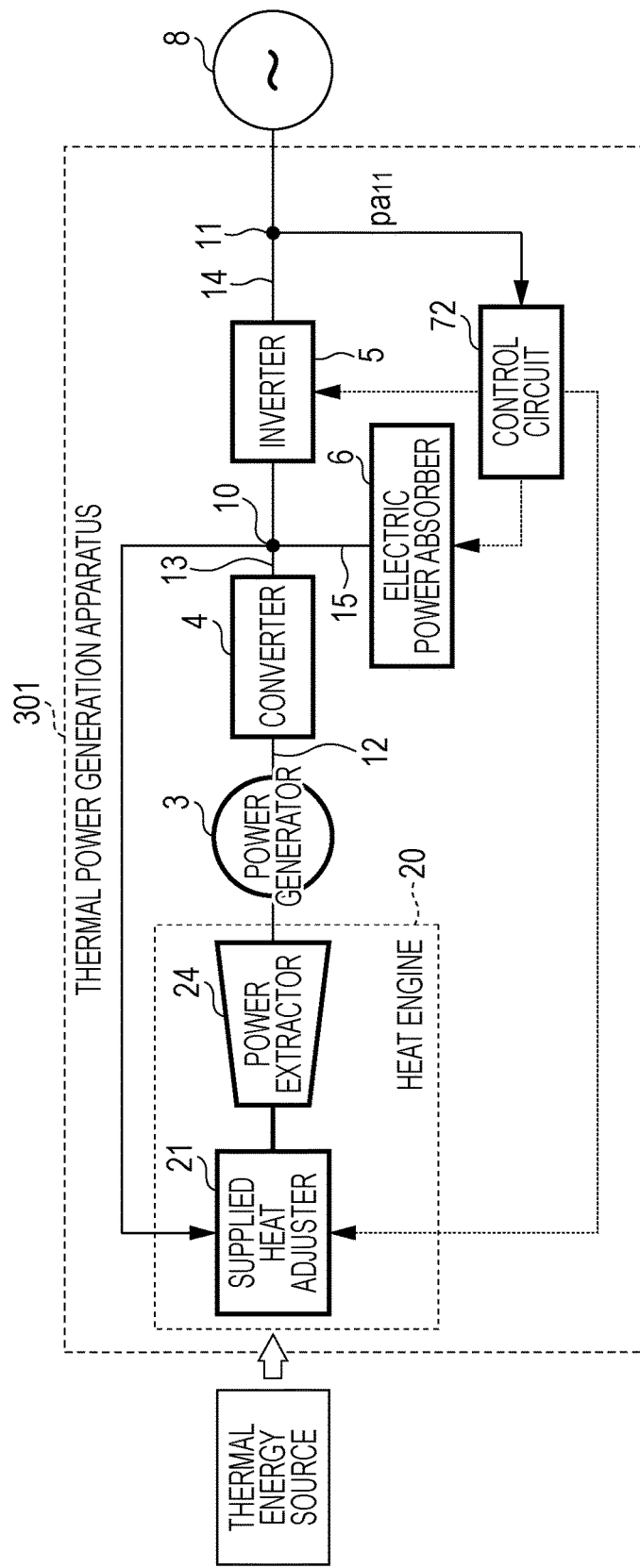
FIG. 13 is a view illustrating a configuration example of a thermal power generation apparatus.

A thermal power generation apparatus 301 illustrated in FIG. 13 includes a control circuit 72 instead of the control circuit 7.

The control circuit 72 uses an electric parameter $pa_{11}$. The electric parameter $pa_{11}$ is a voltage of a commercial system 8. The electric parameter $pa_{11}$ is acquired at an interconnection point 11 of an alternating-current power line 14.

Control Performed by Thermal Power Generation Apparatus

Specifically, the control circuit 72 acquires a frequency (system frequency $F_{ac}$) of the voltage of the commercial system 8. The control circuit 72 detects a timing of frequency rise and a timing of a frequency drop (recovery) in the commercial system 8 by using the system frequency $F_{ac}$. The timing of frequency rise in the commercial system 8 corresponds to a timing of a voltage drop in the commercial system 8. The timing of a frequency drop (recovery) in the commercial system 8 corresponds to a timing of voltage rise (recovery) in the commercial system 8. Control performed by the thermal power generation apparatus 301 is described below with reference to FIG. 14.

In Step S401, the system frequency $F_{ac}$ is acquired at the interconnection point 11.

In Step S402, it is determined whether or not the system frequency $F_{ac}$ is higher than a threshold frequency $F_{ac1}$. In a case where it is determined that the system frequency $F_{ac}$ is higher than the threshold frequency $F_{ac1}$, the processing proceeds to Step S103. In a case where it is determined that the system frequency $F_{ac}$ is not more than the threshold frequency $F_{ac1}$, the processing returns to Step S401. That is, the operation mode is kept at the normal mode.

In Step S406, the system frequency $F_{ac}$ is acquired at the interconnection point 11.

In Step S407, it is determined whether or not the system frequency $F_{ac}$ is not more than the threshold frequency $F_{ac1}$.

In a case where it is determined that the system frequency $F_{ac}$ is not more than the threshold frequency $F_{ac1}$, the operation mode is switched from the specific mode to the normal mode (Step S108), and the processing returns to Step S401. In a case where it is determined that the system frequency $F_{ac}$ is higher than the threshold frequency $F_{ac1}$, the processing returns to Step S105. That is, the operation mode is kept at the specific mode.

Figure 14:
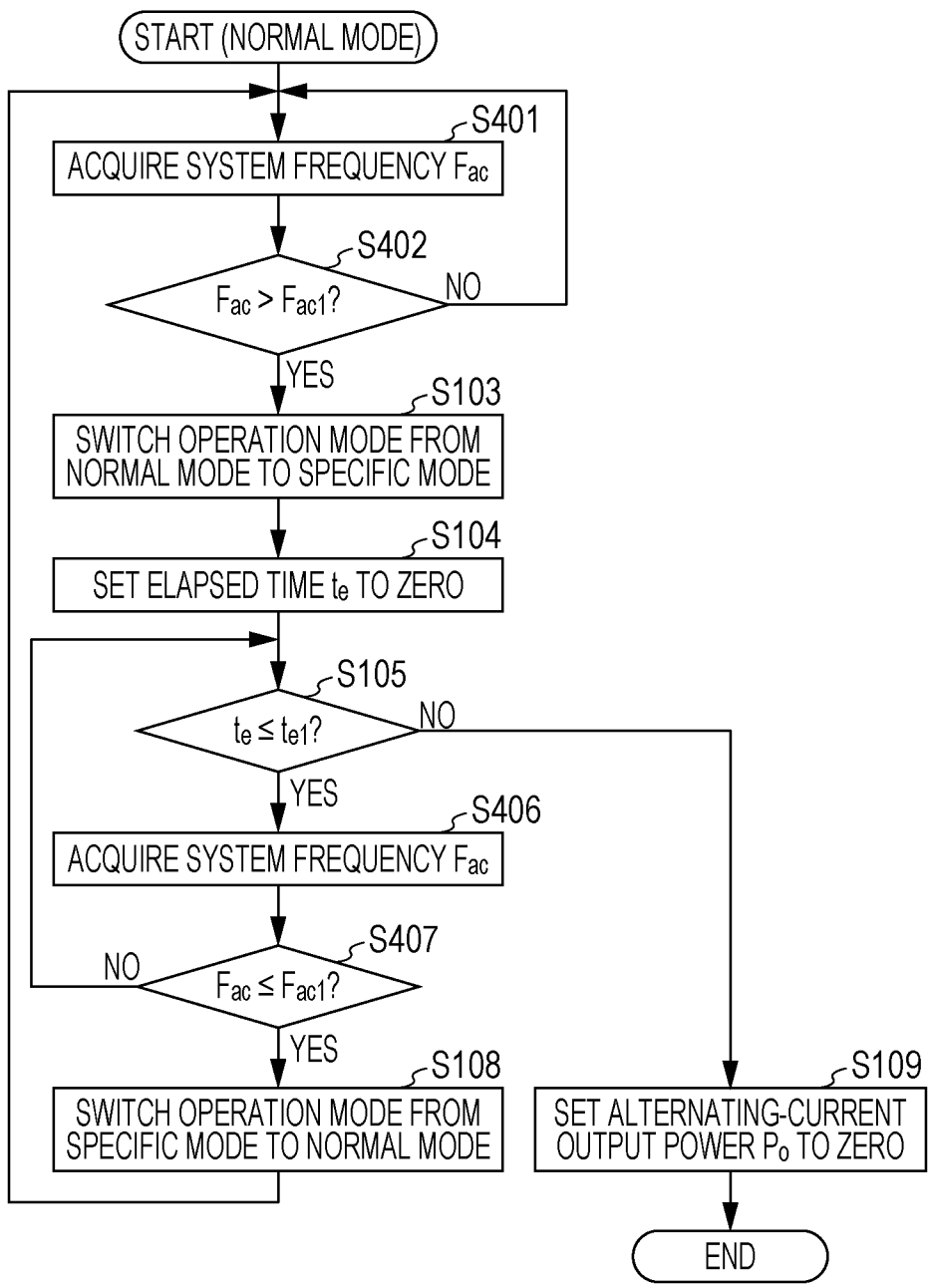
FIG. 14 is a flow chart for explaining control performed by the thermal power generation apparatus of FIG. 13.

Control in Case where Frequency Recovery is Detected within Limited Time from Frequency Rise As illustrated in FIG. 14, in the thermal power generation apparatus 301, there is a case where the operation mode that has been set to the normal mode is switched to the specific mode once (Step S103) and is then switched to the normal mode (Step S108). A time chart showing this case is illustrated in FIG. 15A.

Figure 15A:
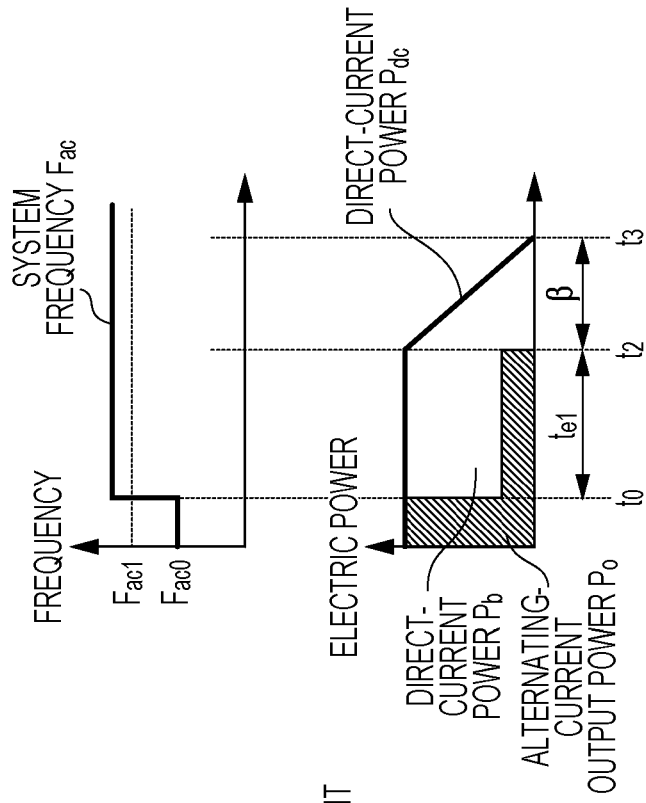
FIGS. 15A and 15B are time charts for explaining control performed by the thermal power generation apparatus of FIG. 13.

In the upper portion of FIG. 15A, the system frequency $F_{ac}$ is indicated by the solid line. The system frequency $F_{ac}$ is initially kept at a rated frequency $F_{ac0}$. At a time $t_0$, the system frequency $F_{ac}$ is higher than the threshold frequency $F_{ac1}$. Accordingly, at the time $t_0$, the operation mode is switched from the normal mode to the specific mode (Steps S402 and S103 in FIG. 14). Next, at a time $t_1$, the system frequency $F_{ac}$ is not more than the threshold frequency $F_{ac1}$. The time $t_1$ is earlier than a time $t_2$, which is a time after elapse of a limited time $t_{e1}$ from the time $t_0$. Accordingly, at the time $t_1$, the operation mode is switched from the specific mode to the normal mode (Steps S105, S406, S407, and S108).

Control in Case where Frequency Recovery is not Detected within Limited Time from Frequency Rise As illustrated in FIG. 14, in the thermal power generation apparatus 301, there is a case where the operation mode that has been set to the normal mode is switched to the specific mode (Step S103), and then the alternating-current output power $P_o$ is set to zero (Step S109), and operation of the thermal power generation apparatus 301 is stopped. A time chart showing this case is illustrated in FIG. 15B.

Figure 15B:
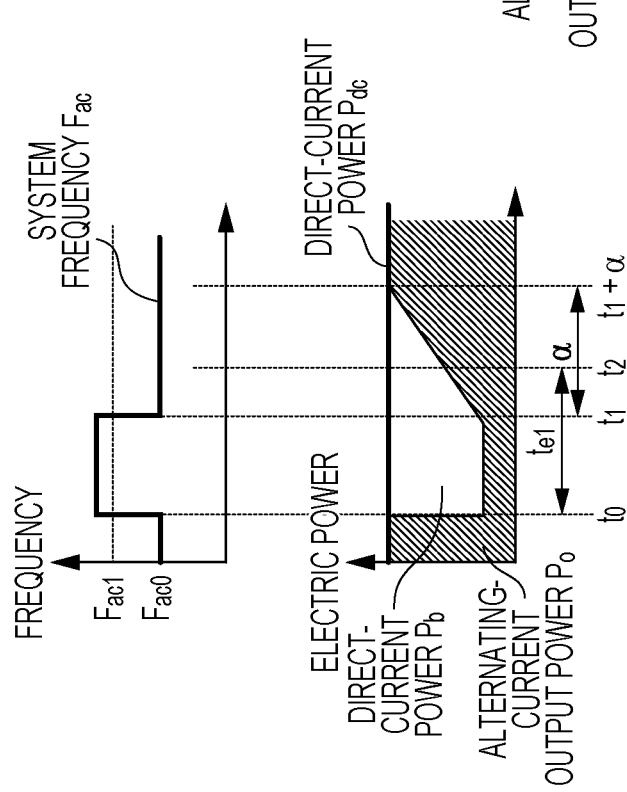

In the example of FIG. 15B, the system frequency $F_{ac}$ is initially kept at a rated frequency $F_{ac0}$. At a time $t_0$, the system frequency $F_{ac}$ is higher than the threshold frequency $F_{ac1}$. Accordingly, at the time $t_0$, the operation mode is switched from the normal mode to the specific mode (Steps S402 and S103 in FIG. 14). In this example, a state where the system frequency $F_{ac}$ is higher than the threshold frequency $F_{ac1}$ is kept during a period from the time $t_0$ to the time $t_2$. That is, the system frequency $F_{ac}$ does not recover to not more than the threshold frequency $F_{ac1}$ after elapse of a limited time $t_{e1}$ from the time $t_0$. Accordingly, at the time $t_2$, the alternating-current output power $P_o$ is set to zero, and operation of the thermal power generation apparatus 301 is stopped (Steps S105, S109, S406, and S407).

According to FIGS. 15A and 15B, it is possible to obtain similar effects to those in the example of FIG. 1.

$F_{ac0}$ is, for example, 50 Hz or 60 Hz. $F_{ac1}$ is, for example, 0.8 Hz or 1.0 Hz higher than $F_{ac0}$. The limited time $t_{e1}$ in this example can be 0.5 seconds or 0.6 seconds. These values are set in consideration of safety of the apparatus and the code.

Other Configuration Example of Thermal Power Generation Apparatus

In a case where the voltage of the commercial system 8 markedly fluctuates, it is possible to stop operation of the thermal power generation apparatus 1 before elapse of the limited time $t_{e1}$. Configuration Example in which this technique is applied to the example of FIG. 1 and FIGS. 6A and 6B is described with reference to the time charts of FIGS. 16A through 16C.

In the example illustrated in FIGS. 16A through 16C, when an effective value $V_{rms}$ of the voltage of the commercial system 8 decreases to less than a threshold voltage $V_{rms2}$ ($<V_{rms1}$), the alternating-current output power $P_o$ is set to zero, and operation of the thermal power generation apparatus 1 is stopped. Moreover, when the phase of the voltage of the commercial system 8 markedly fluctuates due to phase hit, the alternating-current output power $P_o$ is set to zero, and operation of the thermal power generation apparatus 1 is stopped. In the present configuration example, when an absolute value of a phase change $\varphi$ of the voltage of the interconnection point 11 becomes larger than a threshold phase change $\varphi_1$, it is determined that the phase of the voltage of the commercial system 8 has markedly fluctuated. The phase change $\varphi$ is detected by an inverter 5. Specifically, the phase change $\varphi$ is specified as follows. A time taken for a voltage waveform at the interconnection point 11 to pass a voltage zero point from the positive side to the negative side or from the negative side to the positive side is measured. This specifies a time $t_n$ taken for one cycle of the voltage waveform. Assume that a time taken for one cycle in a case where no system abnormality is occurring is $t_0$, the phase change $\varphi$ in the case of $t_n < t_0/2$ is $t_n/t_0 \times 360$ deg, and the phase change $\varphi$ in the case of $t_n \geq t_0/2$ is $(t_n/t_0 \times 360) - 360$ deg. The phase change $\varphi$ in the case where no system abnormality is occurring is 0 deg.

In the example of FIG. 16A, the voltage $V_{rms}$ is initially kept at a rated voltage $V_{rms0}$. The phase change $\varphi$ is kept at a reference phase change $\varphi_0$. The reference phase change $\varphi_0$ is a phase change in the case where no system abnormality is occurring. The reference phase change $\varphi_0$ is 0 deg. At the time $t_0$, the voltage $V_{rms}$ decreases to less than the threshold voltage $V_{rms1}$, but does not decrease to less than the threshold voltage $V_{rms2}$ ($<V_{rms1}$). At the time $t_0$, the phase change $\varphi$ is larger, but is not larger than a threshold phase change $\varphi_1$. Accordingly, at the time $t_0$, operation of the thermal power generation apparatus 1 is not stopped, and the operation mode is switched to the specific mode as in the example illustrated in FIG. 6A.

In the example of FIG. 16B, the voltage $V_{rms}$ is initially kept at a rated voltage $V_{rms0}$. The phase change $\varphi$ is kept at the reference phase change $\varphi_0$. At the time $t_0$, the voltage $V_{rms}$ decreases to less than the threshold voltage $V_{rms1}$, but does not decrease to less than the threshold voltage $V_{rms2}$. Meanwhile, the phase change $\varphi$ at the time $t_0$ is larger than the threshold phase change $\varphi_1$. Accordingly, at the time $t_0$, operation of the thermal power generation apparatus 1 is stopped.

In the example of FIG. 16C, the voltage $V_{rms}$ is initially kept at the rated voltage $V_{rms0}$. The phase change $\varphi$ is kept at the reference phase change $\varphi_0$. At the time $t_0$, the phase change $\varphi$ is large, but is not larger than the threshold phase change $\varphi_1$. Meanwhile, at the time $t_0$, the voltage $V_{rms}$ decreases to less than the threshold voltage $V_{rms2}$. Accordingly, at the time $t_0$, operation of the thermal power generation apparatus 1 is stopped.

Control described with reference to FIGS. 16A through 16C is suitable for securing high safety of a thermal power generation apparatus. Note that in the example of FIGS. 16A through 16C, $\varphi_1 = 41$ deg. Note also that $V_{rms2} = V_{rms0} \times 0.52$.

Other arrangements can also be employed. For example, an electric parameter is not limited to a voltage (the voltage $V_{rms}$ and the direct-current voltage $V_{dc}$). Specifically, the electric parameter may be an electric current, an electric field, a magnetic field, or the like. An instantaneous value of the electric parameter (FIGS. 6A, 6B, 9A, 9B, 12A, 12B, 15A, 15B, 16A, 16B, and 16C) may be used in determining whether to switch the operation mode and whether to stop operation. It is also possible to use a time elapsed after the electric parameter exceeded a threshold value or reached a threshold value (FIGS. 6A, 6B, 9A, 9B, 12A, 12B, 15A, and 15B). It is also possible to use the amount of fluctuation of the electric parameter (FIGS. 6A, 6B, 9A, 9B, 12A, 123, 15A, 15B, 16A, 16B, and 16C). It is also possible to use the time rate of change of the electric parameter although description thereof is omitted. It is also possible to use the amplitude (peak value), an average value, or an effective value of the electric parameter (FIGS. 6A, 6B, 9A, 9B, 12A, and 12B), the phase of the electric parameter (FIGS. 16A through 16C), or the frequency (FIGS. 15A and 15B) of the electric parameter.

Configuration Example 1 of Heat Engine

Figure 17:
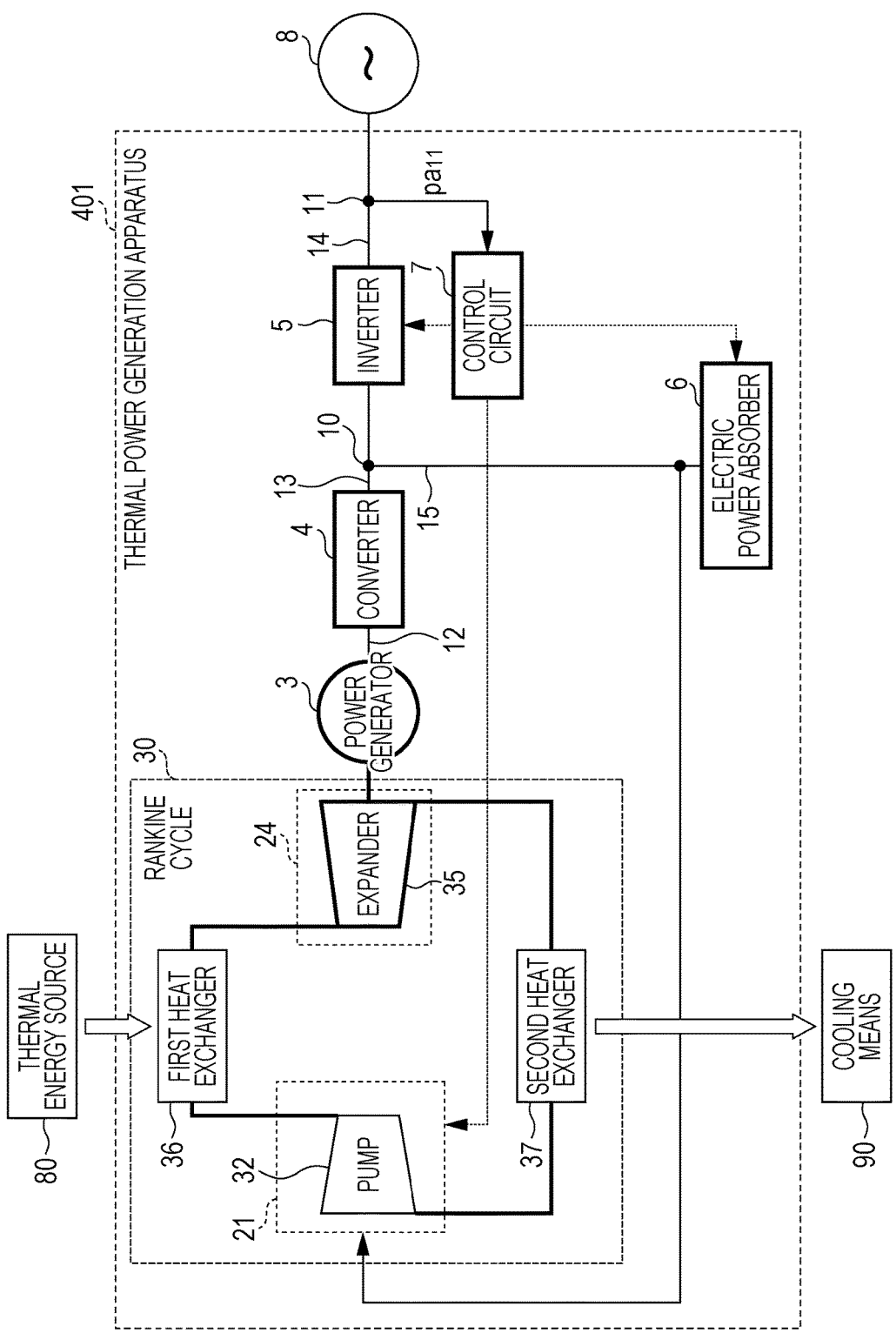
FIG. 17 is a view illustrating a configuration example of a thermal power generation apparatus.

A heat engine 30 illustrated in FIG. 17 can be used as the heat engine 20 illustrated in FIG. 1. The following describes a thermal power generation apparatus 401 illustrated in FIG. 17. Note that elements that are similar to those of FIG. 1 are given identical reference signs and are not explained repeatedly.

The heat engine 30 is a Rankine cycle engine. This means that the thermal power generation apparatus 401 is a versatile device in which various thermal sources can be used. The heat engine 30 includes a pump 32, a first heat exchanger 36, an expander 35, and a second heat exchanger 37. These components are connected in this order. The pump 32 feeds a working fluid by pumping. The pump 32 corresponds to the supplied heat adjuster 21. The first heat exchanger 36 is coupled with the pump 32. The first heat exchanger 36 heats the working fluid by using heat from a thermal energy source 80. The expander 35 is coupled with the first heat exchanger 36. The expander 35 corresponds to the power extractor 24. The second heat exchanger 37 is coupled with the expander 35. The second heat exchanger 37 cools the working fluid by discharging heat from the working fluid to cooling means 90.

The pump 32 includes a pump driving section (not illustrated). The pump driving section adjusts the amount of working fluid fed to the first heat exchanger 36 by pumping. Through this adjustment, the amount of heat $H_s$ per unit time supplied to the expander 35 is adjusted. In the present configuration example, a command is given to the pump driving section by a control circuit, and the supplied heat amount $H_s$ is electrically adjusted. Therefore, the supplied heat amount ft is accurately adjusted.

In the expander 35, the working fluid adiabatically expands. This generates driving force. A power generator 3 operates by this driving force. This generates alternating-current-generated power $P_g$. That is, the expander 35 converts thermal energy of the working fluid into electrical energy in cooperation with the power generator 3. The alternating-current-generated power $P_g$ can be adjusted by adjusting the amount of heat $H_s$ per unit time supplied to the expander 35.

The working fluid expanded in the expander 35 flows into the second heat exchanger 37. In the second heat exchanger 37, the working fluid is condensed by cooling. Then, the working fluid is sucked by the pump 32.

Configuration Example 2 of Heat Engine

Figure 18:
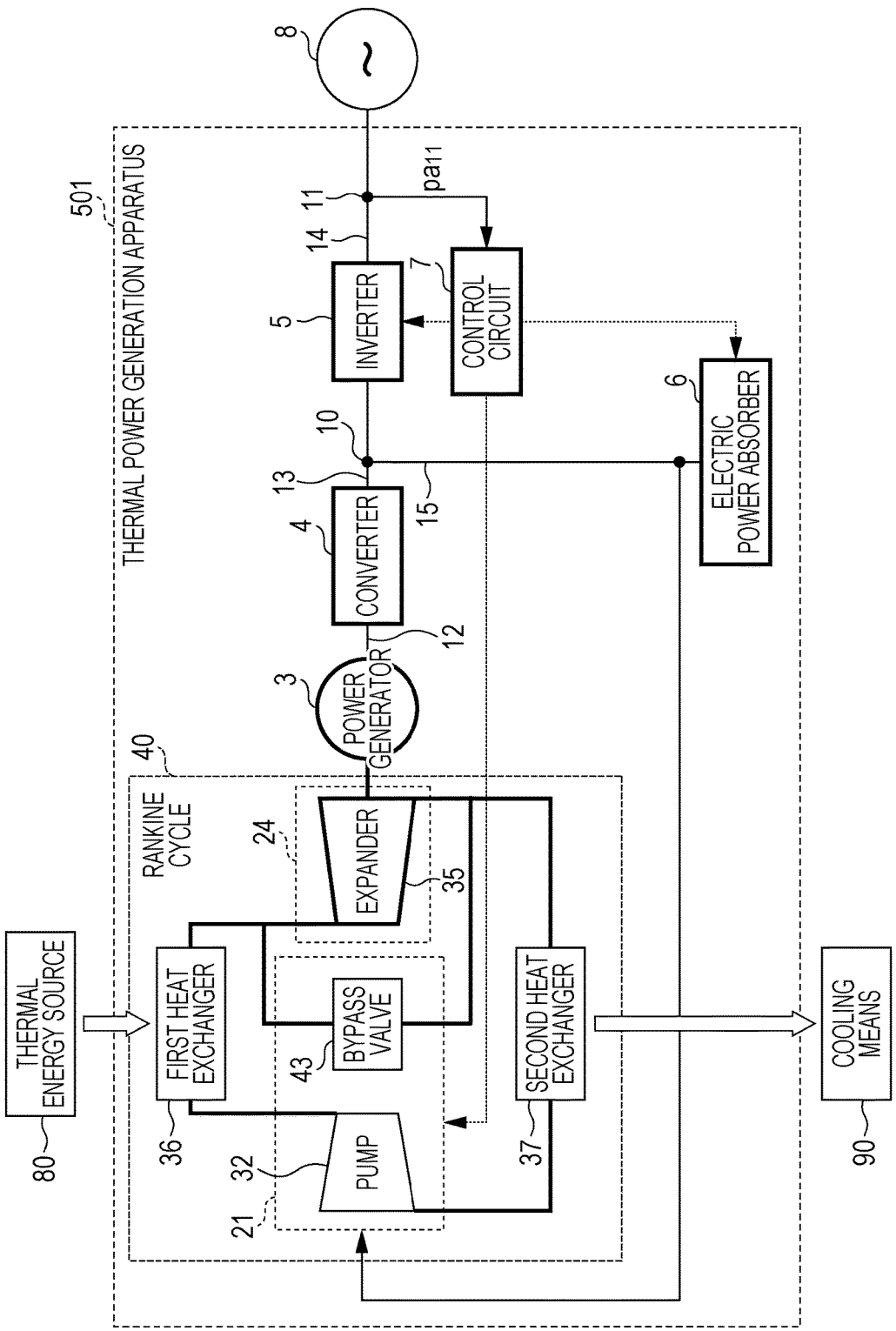
FIG. 18 is a view illustrating a configuration example of a thermal power generation apparatus.

A heat engine 40 illustrated in FIG. 18 can be used instead of the heat engine 30. The following describes a thermal power generation apparatus 501 illustrated in FIG. 18. Note that elements that are similar to those of the thermal power generation apparatus 401 are given identical reference signs and are not explained repeatedly.

The heat engine 40 is obtained by adding a bypass pathway 42 and a bypass valve 43 to the heat engine 30. The pump 32 and the bypass valve 43 correspond to the supplied heat adjuster 21. The bypass pathway 42 bypasses the expander 35. The bypass valve 43 is provided in the bypass pathway 42. The degree of opening of the bypass valve 43 is controlled on the basis of a command given to the bypass valve 43 by a control circuit.

In the present configuration example, the amount of working fluid that flows into the expander 35 is adjusted by using not only the pump 32 but also the bypass valve 43. That is, the amount of heat $H_s$ per unit time supplied to the expander 35 is adjusted by the pump 32 and the bypass valve 43. The bypass valve 43 improves the adjustment accuracy and the adjustment response of the amount of heat $H_s$ per unit time supplied to the expander 35. This secures high safety of the thermal power generation apparatus 501. This characteristic is advantageous especially in a case where the heat engine 40 has a large thermal capacity.

Configuration Example 3 of Heat Engine

Figure 19:
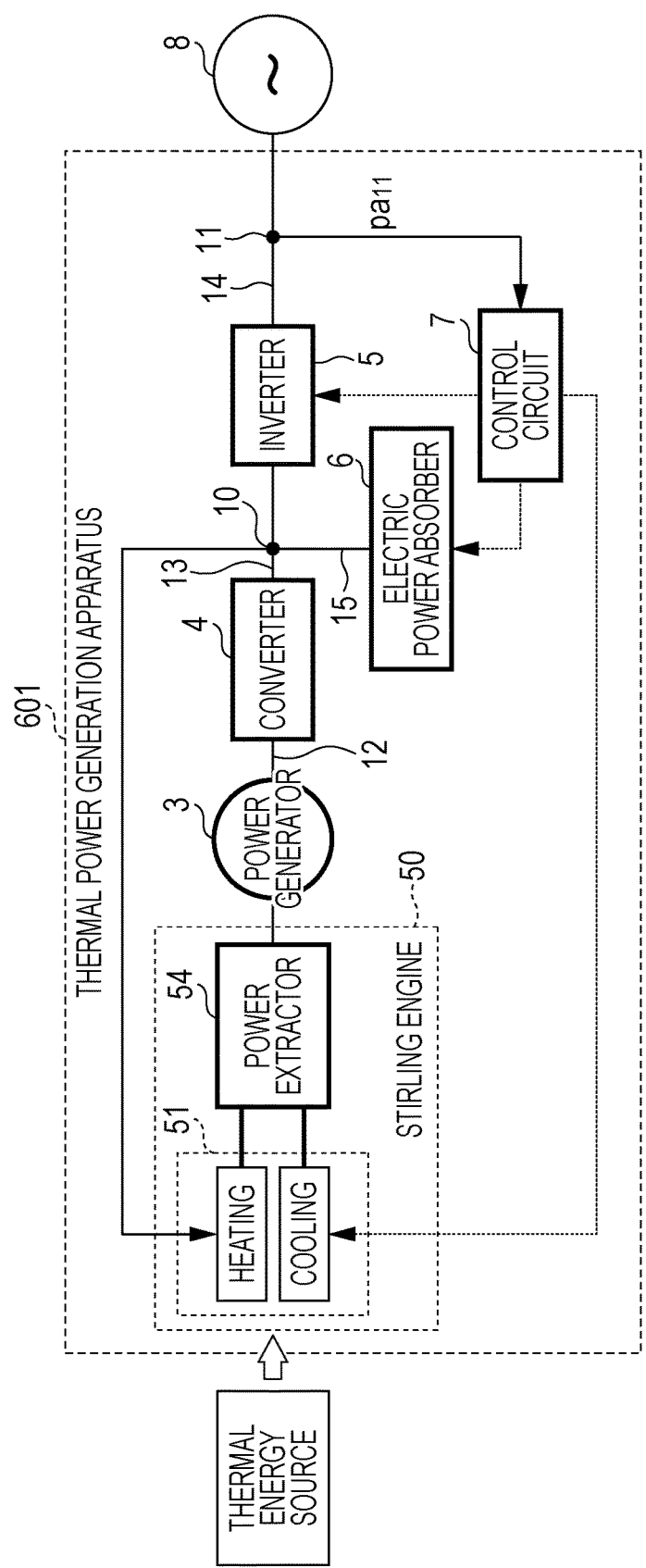
FIG. 19 is a view illustrating a configuration example of a thermal power generation apparatus.

A heat engine 50 illustrated in FIG. 19 can be used instead of the heat engine 30. The following describes a thermal power generation apparatus 601 illustrated in FIG. 19. Note that elements that are similar to those of the thermal power generation apparatus 401 are given identical reference signs and are not explained repeatedly.

The heat engine 50 is a Stirling engine. The heat engine 50 performs a piston action. The heat engine 50 includes a supplied heat adjuster 51 and a power extractor 54.

The supplied heat adjuster 51 heats and cools a working fluid. The working fluid expands when heated. The working fluid is compressed when cooled. Repeated expansion and compression of the working fluid causes a piston action in the power extractor 54. In this way, mechanical power is extracted from the power extractor 54. In the present configuration example, the piston action in the power extractor 54 is controlled on the basis of a command given to the supplied heat adjuster 51 by a control circuit.

The power extractor 54 may have a mechanism that converts the piston action into a rotary action. An example of such a mechanism is a crank mechanism. Such a mechanism makes connection between the power extractor 54 and the power generator 3 easy.

Other Configuration Examples of Heat Engine

A gas engine, a gas turbine, a steam turbine, or the like can be used as a heat engine. These also can convert thermal energy into kinetic energy.

Configuration Example 1 of Thermal Power Generation System

Figure 20:
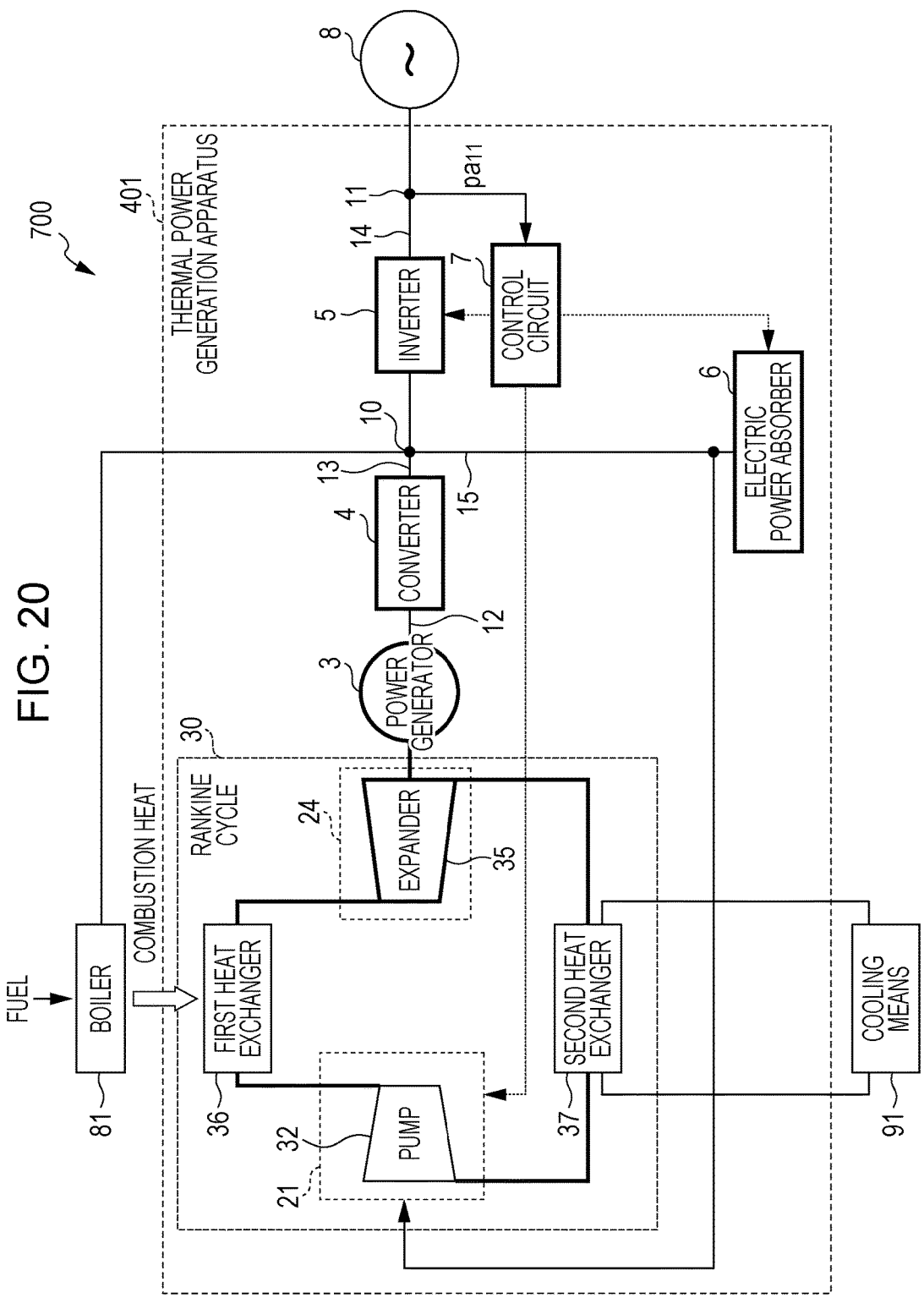
FIG. 20 is a view illustrating a configuration example of a thermal power generation system.

FIG. 20 illustrates a thermal power generation system 700 including a thermal power generation apparatus 401, a boiler 81, and cooling means 91.

The thermal power generation system 700 can generate power by utilizing combustion heat of the boiler 81. The boiler 81 corresponds to the thermal energy source 80 illustrated in FIG. 17. The boiler 81 generates combustion heat by combusting fuel. A first heat exchanger 36 heats a working fluid by using the combustion heat. This places the working fluid in a high-temperature and high-pressure state. Then, the working fluid flows into an expander 35. That is, heat supplied to the expander 35 is obtained from the combustion heat generated by the boiler 81. Note that the combustion heat of the boiler 81 may be given to the working fluid via a medium such as water or may be directly given to the working fluid.

The cooling means 91 corresponds to the cooling means 90 illustrated in FIG. 17. The cooling means 91 is water-cooling type cooling means. The cooling means 91 has cooling water. This cooling water draws heat from the working fluid flowing in a second heat exchanger 37. This heats the cooling water and turns the cooling water into hot water. That is, the thermal power generation system 700 can be suitably used as a CHP that supplies hot water and electricity. Note, however, that air-cooling type cooling means can be used instead of the cooling means 91.

The thermal power generation system 700 is arranged such that operating power of the boiler 81 can be obtained from a connection point 10 in a direct-current power line 13. According to this arrangement, the boiler 81 can operate by using the direct-current power obtained from the connection point 10. That is, the electric power generated by the thermal power generation system 700 can provide electric power for self consumption and provide electric power needed to operate the boiler 81 (secure hot water).

Configuration Example 2 of Thermal Power Generation System

Figure 21:
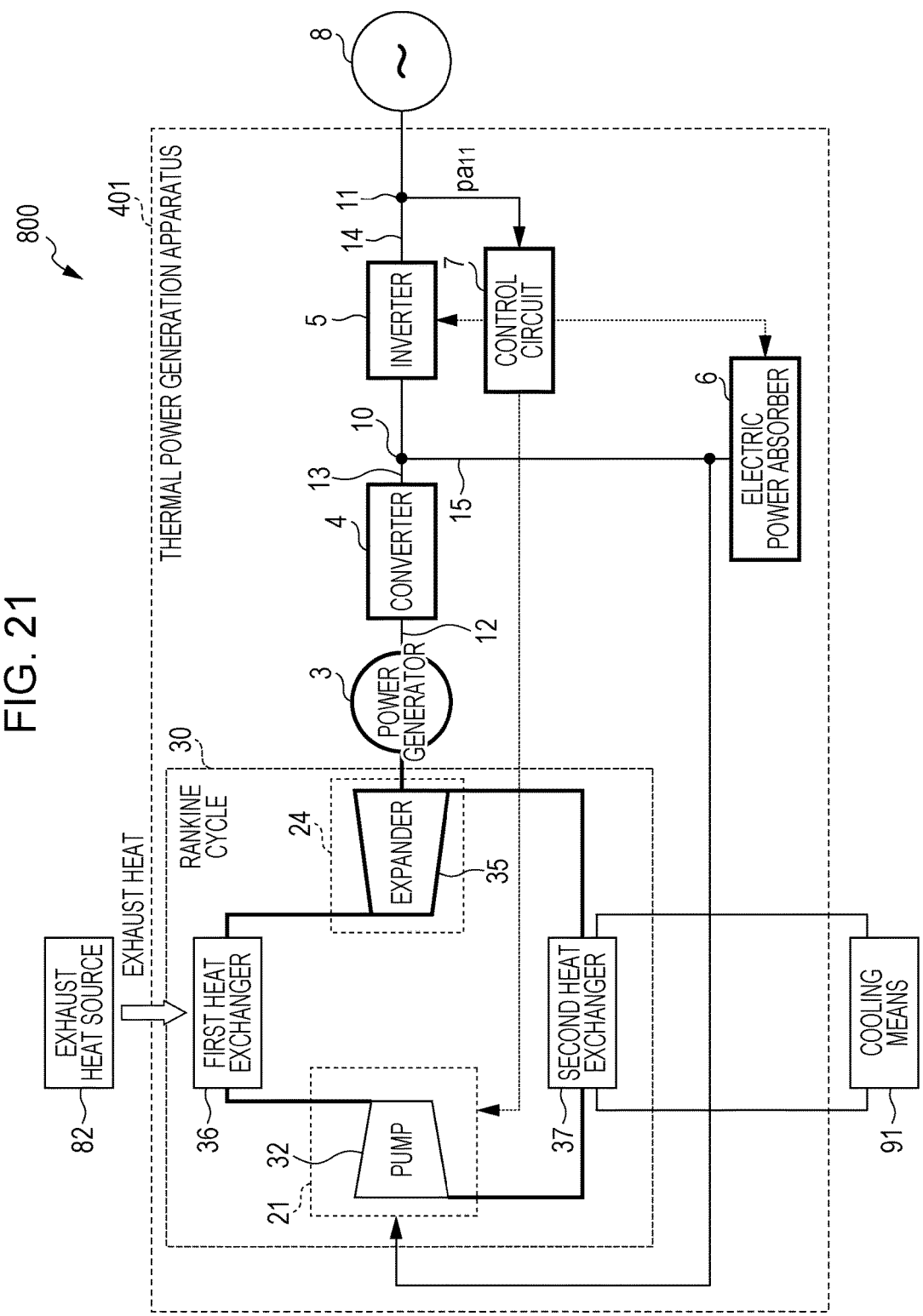
FIG. 21 is a view illustrating a configuration example of a thermal power generation system.

An exhaust heat source (thermal source) 82 illustrated in FIG. 21 can be used instead of the boiler 81. The following describes a thermal power generation system 800 illustrated in FIG. 21.

The thermal power generation system 800 can generate electric power by utilizing exhaust heat of the exhaust heat source 82. The exhaust heat source 82 corresponds to the thermal energy source 80 illustrated in FIG. 17. The exhaust heat source 82 generates exhaust heat. A first heat exchanger 36 heats a working fluid by using the exhaust heat. This places the working fluid in a high-temperature and high-pressure state. Then, the working fluid flows into an expander 35. That is, heat supplied to the expander 35 is obtained from the exhaust heat generated by the exhaust heat source 82. Note that the exhaust heat of the exhaust heat source 82 may be given to the working fluid via a medium such as water or may be directly given to the working fluid.

Utilizing unused exhaust heat is desirable from the perspective of environmental protection. The exhaust heat source 82 is a factory, an engine, a fuel cell, or the like.

A thermal power generation apparatus and a thermal power generation system according to the present disclosure have been described above on the basis of the configuration examples, but the configuration of the present disclosure can be changed in various ways within a range that does not deviate from the main purpose of the disclosure. That is, it should be understood that the above configuration examples are merely illustrative examples in every way and are not restrictive. It should be understood that the technical range of the present disclosure is indicated not by the description in the above configuration examples but by the claims, and includes equivalent meaning to the claims and all changes belonging to the claims.

What is claimed is:

1. A thermal power generation apparatus comprising:
   a heat engine that extracts mechanical power from heat supplied by a heat supply source;
   a power generator that generates alternating-current power from the extracted mechanical power;
   a converter that generates direct-current power from the generated alternating-current power;
   an inverter that is connected to the converter via a direct-current power line, the inverter generating alternating-current power from the direct-current power and outputting the alternating-current power to a commercial system;
   an electric power absorber that is connected to the direct-current power line connecting the converter and the inverter, the electric power absorber absorbing at least part of the direct-current power transmitted from the converter toward the inverter; and
   a control circuit that detects a voltage drop and voltage recovery in the commercial system and selects a single operation mode from among a plurality of modes including a normal mode and a specific mode,
   the control circuit, when selecting the normal mode, controlling the inverter to adjust the alternating-current power output from the inverter, thereby causing a direct-current voltage in the direct-current power line to follow a target voltage,
   the control circuit, when selecting the specific mode, controlling the inverter to adjust the alternating-current power output from the inverter, thereby causing the direct-current voltage in the direct-current power line to follow the target voltage and controlling the electric power absorber to absorb at least part of the direct-current power,
   the amount of the alternating-current power output from the inverter in the specific mode being smaller than that in the normal mode.

2. The thermal power generation apparatus according to claim 1, wherein:
   the control circuit detects a voltage drop and voltage recovery in the commercial system by using an electric parameter detected in the direct-current power line or an electric parameter detected in an alternating-current power line that transmits the alternating-current power output from the inverter; and
   the control circuit switches the operation mode from the normal mode to the specific mode upon detection of the voltage drop or switches the operation mode from the specific mode to the normal mode upon detection of the voltage recovery.

3. The thermal power generation apparatus according to claim 2, wherein:
   the electric parameter is a voltage, a direct-current voltage, an electric current, an electric field, or a magnetic field.

4. The thermal power generation apparatus according to claim 1, wherein:
   the control circuit controls the inverter to set the alternating-current power output from the inverter to zero in a case where the voltage recovery is not detected within a limited time after switching from the normal mode to the specific mode.

5. The thermal power generation apparatus according to claim 1, further comprising a connecting mechanism that connects the inverter and the commercial system,
   the control circuit controlling the connecting mechanism to break connection between the inverter and the commercial system in a case where the voltage recovery is not detected within a limited time after switching from the normal mode to the specific mode.

6. The thermal power generation apparatus according to claim 1, wherein:
   the amount of direct-current power absorbed by the electric power absorber in the specific mode is larger than that in the normal mode.

7. The thermal power generation apparatus according to claim 1, wherein:
   the electric power absorber includes a resistor and a semiconductor switch connected to the resistor.

8. The thermal power generation apparatus according to claim 1, wherein:

the electric power absorber includes a capacitor and a charge-discharge circuit connected to the capacitor, the charge-discharge circuit adjusting an electric current that flows into the capacitor and an electric current that flows out of the capacitor.

9. The thermal power generation apparatus according to claim 8, wherein:
the electric power absorber further includes a power storage state detector that detects a power storage state of the capacitor.

10. The thermal power generation apparatus according to claim 8, wherein:
the charge-discharge circuit includes a DC-DC converter.

11. The thermal power generation apparatus according to claim 8, wherein:
the thermal power generation apparatus uses the direct-current power stored in the capacitor as power for activating the thermal power generation apparatus.

12. The thermal power generation apparatus according to claim 1, wherein:
the heat engine is a Rankine cycle engine including a pump that feeds a working fluid by pumping, a first heat exchanger that provides heat from the heat supply source to the working fluid, an expander, and a second heat exchanger that discharges heat from the working fluid; and
the pump, the first heat exchanger, the expander, and the second heat exchanger are connected in this order.

13. The thermal power generation apparatus according to claim 1, wherein:
the control circuit, when selects the specific mode, (i) controls the inverter to adjust the alternating-current power output from the inverter so that the direct-current voltage in the direct-current power line follows the target voltage, (ii) controls the electric power absorber to absorb at least part of the direct-current power, and (iii) controls the heat engine to adjust an amount of heat per unit time supplied to the heat engine.

14. The thermal power generation apparatus according to claim 13, wherein:
the amount of heat per unit time supplied to the heat engine in the specific mode is smaller than that in the normal mode.

15. The thermal power generation apparatus according to claim 14, wherein:
the amount of direct-current power absorbed by the electric power absorber in the specific mode is larger than that in the normal mode; and
the amount of heat per unit time supplied to the heat engine in the specific mode is larger than zero and not more than that in the normal mode.

16. The thermal power generation apparatus according to claim 11, wherein:
the heat engine is a Rankine cycle engine including a pump that feeds a working fluid by pumping, a first heat exchanger that provides heat from the heat supply source to the working fluid, an expander, and a second heat exchanger that discharges heat from the working fluid;
the pump, the first heat exchanger, the expander, and the second heat exchanger are connected in this order; and
the control circuit adjusts an amount of heat per unit time supplied to the expander by the pump.

17. The thermal power generation apparatus according to claim 13, wherein:
the heat engine is a Rankine cycle engine including a pump that feeds a working fluid by pumping, a first heat exchanger that provides heat from the heat supply source to the working fluid, an expander, and a second heat exchanger that discharges heat from the working fluid;
the pump, the first heat exchanger, the expander, and the second heat exchanger are connected in this order;
the Rankine cycle engine further includes a bypass pathway that bypasses the expander and a bypass valve provided in the bypass pathway; and
the control circuit adjusts an amount of heat per unit time supplied to the expander by the pump and the bypass valve.

18. The thermal power generation apparatus according to claim 1, wherein:
the heat engine includes an expander.

19. A thermal power generation system comprising:
the thermal power generation apparatus set forth in claim 1; and
a boiler,
the boiler being the heat supply source and acquiring the direct-current power from the direct-current power line that connects the converter and the inverter.

20. A thermal power generation system comprising:
the thermal power generation apparatus set forth in claim 1; and
a thermal source,
exhaust heat from the thermal source being the heat supplied by the heat supply source.

* * * * *